(12) United States Patent
Hara et al.

(10) Patent No.: US 11,775,083 B2
(45) Date of Patent: Oct. 3, 2023

(54) ACTIVE PEN AND SENSOR CONTROLLER THAT USE DATA GENERATED FROM IDENTIFICATION DATA

(71) Applicant: Wacom Co., Ltd., Saitama (JP)

(72) Inventors: Hideyuki Hara, Saitama (JP); Masayuki Miyamoto, Saitama (JP); Sadao Yamamoto, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 16/782,946

(22) Filed: Feb. 5, 2020

(65) Prior Publication Data

US 2020/0174589 A1    Jun. 4, 2020

Related U.S. Application Data

(63) Continuation of application No. PCT/JP2018/032816, filed on Sep. 5, 2018.

(30) Foreign Application Priority Data

Sep. 15, 2017 (JP) .................................. 2017-178240

(51) Int. Cl.
  *G06F 3/033* (2013.01)
  *G06F 3/0354* (2013.01)
  *G06F 3/038* (2013.01)
  *G06F 3/041* (2006.01)

(52) U.S. Cl.
  CPC ........ *G06F 3/03545* (2013.01); *G06F 3/0383* (2013.01); *G06F 3/0416* (2013.01)

(58) Field of Classification Search
  None
  See application file for complete search history.

(56) References Cited

U.S. PATENT DOCUMENTS

| | | | | |
|---|---|---|---|---|
| 5,612,720 A | * | 3/1997 | Ito | G06F 3/03545 178/19.01 |
| 6,249,276 B1 | * | 6/2001 | Ohno | G06F 1/1626 345/173 |

(Continued)

FOREIGN PATENT DOCUMENTS

JP    2016-122382 A    7/2016

OTHER PUBLICATIONS

International Search Report, dated Nov. 13, 2018, for International Application No. PCT/JP2018/032816, 1 page.

(Continued)

*Primary Examiner* — Roberto W Flores
*Assistant Examiner* — Donna V Bocar
(74) *Attorney, Agent, or Firm* — Seed IP Law Group LLP

(57) ABSTRACT

An active pen that is used together with a sensor controller includes: an electrode provided at a pen tip, a memory that stores identification data, and a processor connected to the electrode and the memory. The processor returns, as a response to a first uplink signal transmitted from the sensor controller, a response signal including the identification data stored by the memory, and decides, based on whether data corresponding to the identification data is included in a second uplink signal received after the response signal is transmitted, whether the active pen is detected by the sensor controller.

16 Claims, 13 Drawing Sheets

(56) References Cited

U.S. PATENT DOCUMENTS

| | | | |
|---|---|---|---|
| 2003/0063943 A1* | 4/2003 | Lapstun | B43K 29/003 178/79 |
| 2009/0024988 A1* | 1/2009 | Edgecomb | G06F 3/038 717/168 |
| 2010/0085325 A1* | 4/2010 | King-Smith | G06F 3/04162 345/174 |
| 2015/0277587 A1 | 10/2015 | Chandran et al. | |
| 2015/0365841 A1* | 12/2015 | Wilhelmsson | H04W 36/0094 370/252 |
| 2015/0365942 A1* | 12/2015 | Niu | H04W 48/08 370/330 |
| 2016/0188018 A1* | 6/2016 | Handa | G06F 3/0383 345/179 |
| 2016/0246390 A1 | 8/2016 | Lukanc et al. | |
| 2016/0299583 A1 | 10/2016 | Watanabe | |
| 2016/0306444 A1* | 10/2016 | Fleck | G06F 13/4282 |
| 2017/0153763 A1* | 6/2017 | Vavra | G06F 3/0488 |
| 2017/0262084 A1* | 9/2017 | Qiao | G06F 3/0416 |
| 2018/0232068 A1* | 8/2018 | Gordon | G06F 3/04847 |

OTHER PUBLICATIONS

Extended European Search Report, dated Oct. 8, 2020, for European Application No. 18856859.6, 9 pages.

* cited by examiner

FIG.1
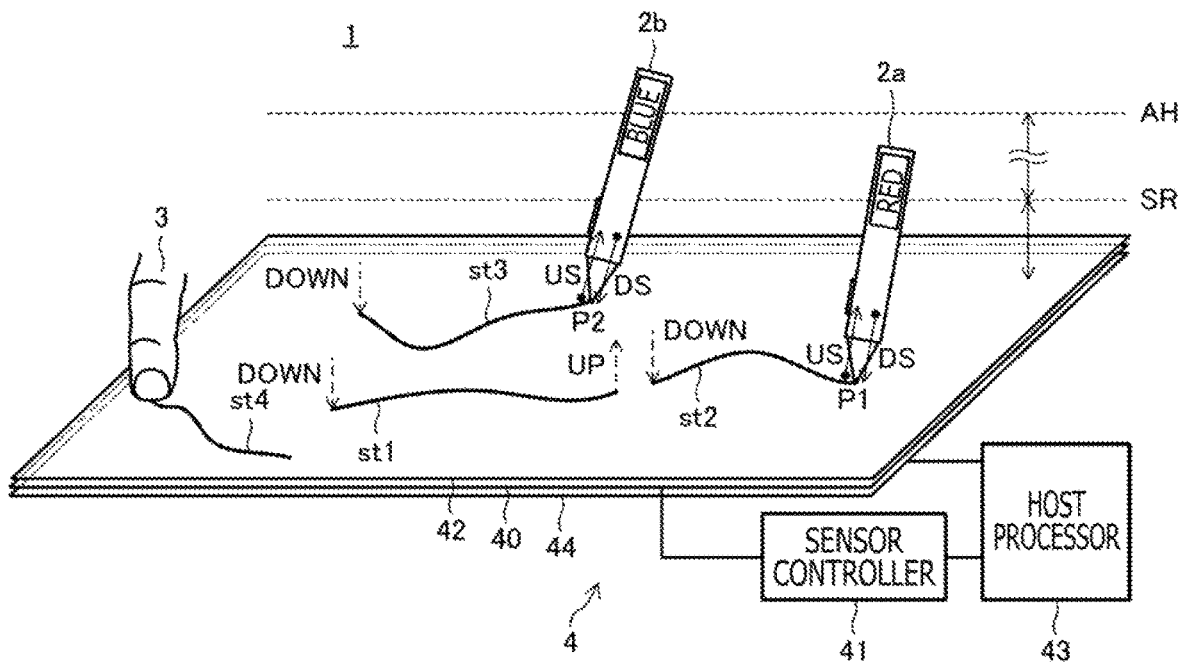
FIG.2A
COMMAND SIGNAL C
| COMMAND | FLAG |
|---|---|
| D1 | D2 |
FIG.2B
MULTI UPLINK SIGNAL M/U
| FLAG | FLAG | CORRESPONDING DATA | CORRESPONDING DATA |
|---|---|---|---|
| D3a | D3b | D4a | D4b |
FIG.3
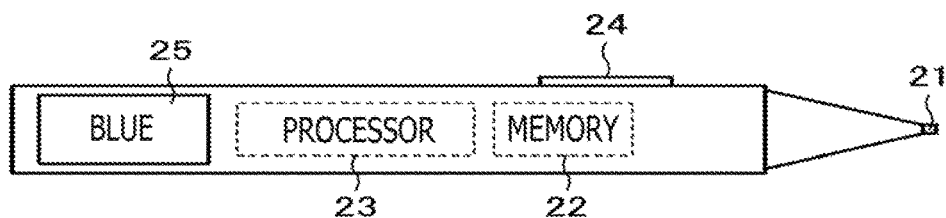

ACTIVE PEN AND SENSOR CONTROLLER THAT USE DATA GENERATED FROM IDENTIFICATION DATA

BACKGROUND

Technical Field

The present disclosure relates to an active pen and a sensor controller, and particularly to an active pen and a sensor controller between which pairing is performed before communication is started.

Background Art

In communication that is performed between an active pen and a sensor controller that configures a position detection system, a beacon signal is used in some cases. The beacon signal is a signal that is periodically supplied (or transmitted) from the sensor controller to the active pen, and the active pen is configured such that, in the case where it is not paired as yet but detects (or receives) a beacon signal supplied from the sensor controller, it transmits a response signal immediately after the detection (or reception) of a beacon signal. The sensor controller executes pairing with the active pen in response to reception of the response signal. U.S. Patent Publication No. 2016/0246390 discloses an example of a sensor controller that performs such operation as described above.

The transmission interval of the beacon signal is used as a period for transmitting a signal (including the response signal described above. Hereinafter referred to as a "pen signal") from the active pen to the sensor controller. This period is configured from a combination of a plurality of time slots and a plurality of frequencies, and the active pen is configured to perform transmission of a pen signal using only those of the time slots and frequencies allocated thereto by the sensor controller.

BRIEF SUMMARY

A procedure of pairing performed between an active pen and a sensor controller is described in detail. The sensor controller that receives the response signal described above deploys, into a beacon signal to be transmitted next, a packet that designates a pen identifier (ID) that is not allocated to any active pen as yet and a time slot and a frequency within a beacon period. The active pen that receives this packet but is not paired as yet stores the pen ID deployed in the packet. Allocation of the pen ID by the sensor controller, namely, pairing between the sensor controller and the active pen, is completed therewith. This active pen thereafter uses the designated time slot and frequency to start transmission of a pen signal to the sensor controller.

However, such a procedure for pairing as described above has a subject that a same pen ID is allocated to a plurality of active pens in some cases. In the following, this subject is described in detail taking an example.

Since the sensor controller and the active pen have a difference in transmission power therebetween, usually the reach distance of the beacon signal is longer than the reach distance of the pen signal. If a case is considered in which an active pen A enters a range within which its pen signal reaches the sensor controller and another active pen B enters a range within which it can receive the beacon signal from the sensor controller although it is outside a region within which its pen signal reaches the sensor controller, since the beacon signal transmitted from the sensor controller is received by both of the active pens A and B, both of the active pens A and B transmit a response signal to the beacon signal. Although the response signal transmitted from the active pen A from between the two response signals transmitted in this manner reaches the sensor controller, the response signal transmitted from the active pen B is attenuated before it reaches the sensor controller and therefore does not reach the sensor controller. Accordingly, the sensor controller decides that the response signal is received from one active pen and transmits a beacon signal including one pen ID to be allocated to the one active pen. Since also this beacon signal is received by both of the active pens A and B, both of the active pens A and B store the same pen ID. The same pen ID is allocated to the active pens A and B in this manner.

Accordingly, one of objects of the present disclosure resides in provision of an active pen and a sensor controller by which, in pairing of the active pen and the sensor controller, it is possible to prevent a same pen ID from being allocated to a plurality of active pens.

Further, in some cases, the sensor controller transmits a command to an active pen that is currently paired therewith. In this case, the sensor controller deploys a packet indicative of the pen ID allocated to the active pen of the transmission designation of the command and contents of the command into a beacon signal. It is to be noted that each of the number of pen IDs and the number of commands that can be deployed into one beacon signal is one. The active pen compares the pen ID deployed in the received beacon signal and the pen ID stored therein with each other, and executes operation according to the command only in the case where the compared pen IDs coincide with each other. The command transmitted from the sensor controller includes a command for changing a time slot and a frequency to be allocated to an active pen with which it is paired already.

However, according to such a command transmission method as just described, when the sensor controller performs pairing with a new active pen, processing delay occurs in some cases. In particular, when the sensor controller performs pairing with a new active pen, in order to make it possible for the active pen to transmit a pen signal, it is necessary to change allocation of time slots and frequencies (hereinafter referred to as "transmission and reception schedule") allocated to the other active pens with which the sensor controller is paired. Since it is necessary for this change to be performed before a time slot and a frequency are allocated to the new active pen, the sensor controller must transmit beacon signals for changing the transmission and reception schedules for the other active pens before it transmits a beacon signal for allocating a pen ID to the new active pen. Therefore, the timing for transmitting the beacon signal for allocating a pen ID to the new active pen is delayed, resulting in delay in pairing process.

Accordingly, another one of objects of the present disclosure resides in provision of an active pen and a sensor controller by which delay in pairing process between the active pen and the sensor controller can be prevented.

The active pen according to the present disclosure is an active pen that is used together with a sensor controller, including an electrode provided at a pen tip, a memory configured to store identification data, and a processor connected to the electrode and the memory, wherein the processor, in operation: returns, as a response to a first uplink signal transmitted from the sensor controller, a response signal including the identification data stored by the memory, and decides, based on whether data corresponding to the identification data is included in a second uplink signal received after the response signal is transmitted, whether the active pen is detected by the sensor controller.

According to another aspect of the present disclosure, the active pen described above determines a transmission rate of a downlink signal in response to a number of active pens currently detected by the sensor controller indicated by the second uplink signal.

A sensor controller according to the present disclosure is connected to a sensor and is configured to detect a plurality of active pens from which a plurality of signal is transmitted to the sensor, the sensor controller including: at least one processor; and at least one memory storing instructions that, when executed by the at least one processor, cause the sensor controller to: transmit a first uplink signal, detect a response signal transmitted from one of the active pens that has detected the first uplink signal, extract identification data designated by the one of the active pens from the response signal, and transmit a second uplink signal including data corresponding to the identification data to the active pen.

According to the present disclosure, because identification data (for example, a pen ID) is determined by ab active pen, it can be prevented that, in pairing between the active pen and a sensor controller, the same identification data is allocated to a plurality of active pens.

Further, according to the other aspect of the present disclosure, because the active pen autonomously changes its transmission rate in response to a change of a number of active pens currently detected by the sensor controller, a delay of the pairing process between the active pen and the sensor controller can be prevented in comparison with that in an alternative case in which transmission and reception schedules are transmitted from the sensor controller to the individual active pens.

BRIEF DESCRIPTION OF THE DRAWINGS

FIG. 1 is a view depicting an entire position detection system according to an embodiment of the present disclosure;

FIGS. 2A and 2B are views depicting different types of an uplink signal according to the embodiment of the present disclosure;

FIG. 3 is a view depicting a configuration of an active pen according to the embodiment of the present disclosure;

DETAILED DESCRIPTION

Figure 4:
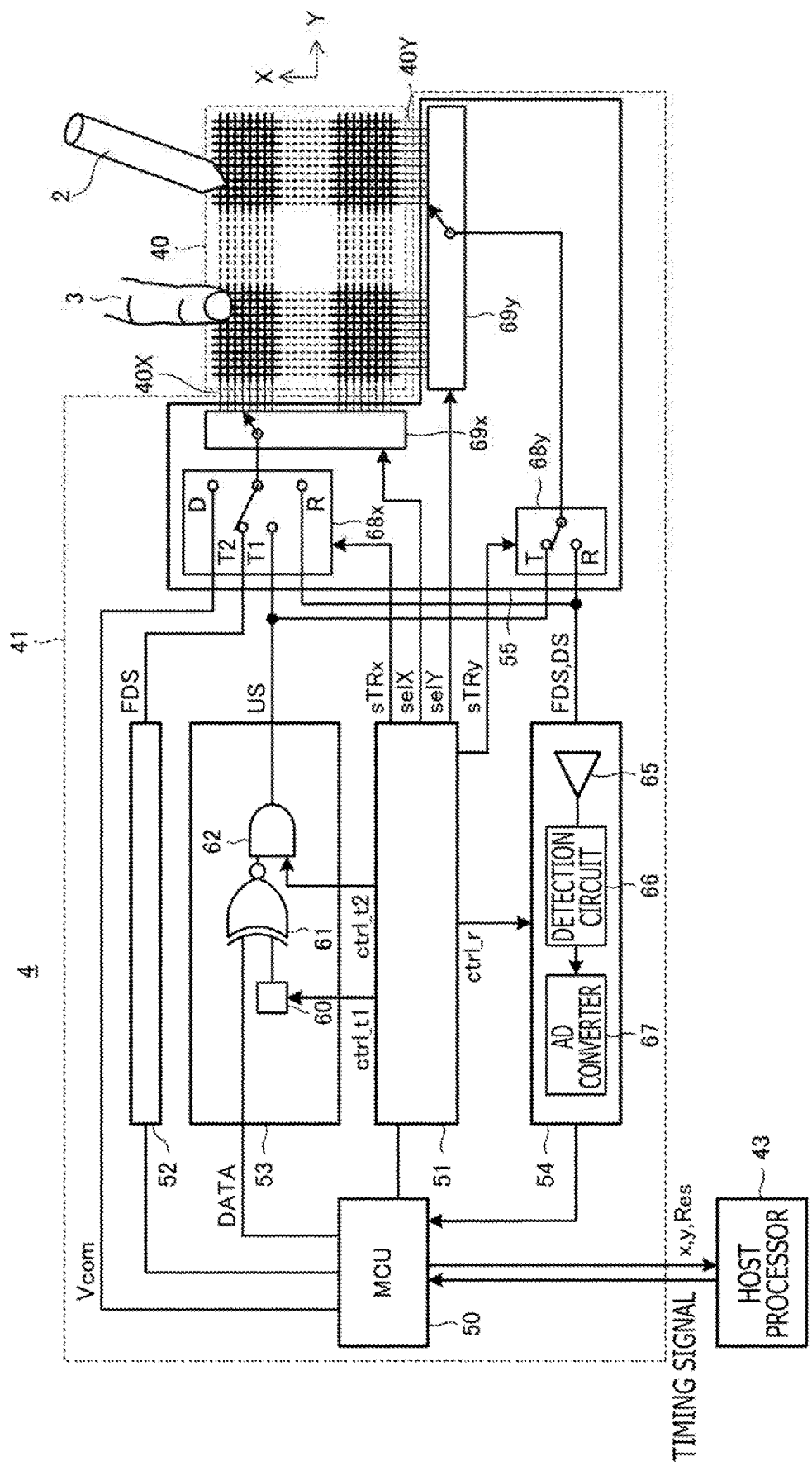
FIG. 4 is a view depicting details of a configuration of a sensor and a sensor controller according to the embodiment of the present disclosure.

In the following, an embodiment of the present disclosure is described in detail with reference to the accompanying drawings.

FIG. 1 is a view depicting an entire position detection system 1 according to the present embodiment. As depicted in FIG. 1, the position detection system 1 is configured including two active pens 2a and 2b and an electronic apparatus 4. The electronic apparatus 4 is configured including a sensor 40, a sensor controller 41, a panel 42, a host processor 43, and a liquid crystal display device 44.

Both of the active pens 2a and 2b are electronic pens compatible with an active capacitive method and are used as indicators for indicting a position on the front face of the panel 42 (hereinafter referred to merely as "panel face") to the electronic apparatus 4 simultaneously or separately by one or more users. In the position detection system 1, also a finger 3 of a user is used additionally as an indicator. In the following description, in the case where there is no necessity to distinguish the active pens 2a and 2b from each other, each of them may be referred to as active pen 2. Further, the following description is given assuming that the electronic apparatus 4 is ready for simultaneous use of two active pens 2 in the maximum. However, naturally the electronic apparatus 4 may be configured so as to allow simultaneous use of three or more active pens 2.

For example, when the active pen 2a is used, the user would gradually move the active pen 2a toward the panel face (down: in FIG. 1, represented as "DOWN") until a pen tip of the active pen 2a is finally brought into contact (touch) with the panel face. Then, if the user moves the pen tip on the panel face while keeping this contact state, then a locus st1 of the movement is drawn on the liquid crystal display device 44 by a process of the electronic apparatus 4 hereinafter described. This drawing is continued until the user moves the pen tip of the active pen 2a away (up: in FIG. 1, represented as "UP") from the panel face. Thereafter, if the user carries out such down, touch, move, and up again, then a locus st2 of the movement is drawn similarly on the panel face by a process of the electronic apparatus 4. In FIG. 1, also a locus st3 created by down, touch, move, and up of the active pen 2b and a locus st4 created by down, touch, move, and up of the finger 3 are depicted.

The active pen 2 is configured such that it performs communication mutually with the sensor controller 41 using an uplink signal US and a downlink signal DS as depicted in FIG. 1. In particular, the active pen 2 is configured such that it detects an uplink signal US transmitted from the sensor controller 41 through the sensor 40 and transmits a predetermined downlink signal DS in response to the uplink signal US. The downlink signal DS is received by the sensor 40 and supplied from the sensor 40 to the sensor controller 41.

FIGS. 2A and 2B are views depicting different types of the uplink signal US. As depicted in FIGS. 2A and 2B, as the uplink signal US used in the present embodiment, two types of uplink signals US including a command signal C (first uplink signal) and a multi uplink signal M/U (second uplink signal) are available.

The command signal C is a signal including a command D1 and an extension flag D2 as depicted in FIG. 2A. The command D1 includes data of two bits indicative of a protocol (active capacitive method or the like) for which the sensor controller 41 is ready, data of three bits indicative of a frequency to be used by the active pen 2 to transmit a downlink signal DS, data of four bits indicative of deployment of time slots hereinafter described (time interval, duration, and time slot number in one frame), data of one bit indicative of contents (burst data or default data) of a downlink signal DS to be transmitted from the active pen 2, and data of one bit for identifying two active pens 2 under detection from each other. It is to be noted that, although details of the default data are prescribed in the protocol, it is, for example, writing pressure data, switch data, and so forth, hereinafter described. The extension flag D2 is data (flag information) of one bit indicative of whether or not a multi uplink signal M/U follows. In the case where one or more active pens 2 are under detection (in the case where the sensor controller 41 is in a full mode or a two-pen mode hereinafter described), the sensor controller 41 sets the extension flag D2 to "1," but sets the extension flag D2 to "0" in any other case (in the case where the sensor controller 41 is in a global mode).

The multi uplink signal M/U is a signal including detected flags D3a and D3b and corresponding data D4a and D4b as depicted in FIG. 2B. Each of the detected flags D3a and D3b is data of one bit and is "0" in its initial state. Each of the corresponding data D4a and D4b is data of five bits and is "00000" in its initial state. The sensor controller 41 is configured such that, in the case where it detects a first active pen 2, it changes the detected flag D3a from "0" to "1" and sets corresponding data corresponding to the identification data of the first active pen 2 as the corresponding data D4a into the multi uplink signal M/U. It is to be noted that the corresponding data may be the identification data itself or may be data obtained by performing predetermined arithmetic operation for the identification data. The predetermined arithmetic operation is an arithmetic operation set in advance in both of the active pen 2 and the sensor controller 41 (namely, an arithmetic operation shared in advance by the active pen 2 and the sensor controller 41) as part of the protocol and may be, for example, four arithmetic operations or may be the surplus in the case where the identification data is divided by a predetermined value or else may be a cyclic shift of a bit string. Further, the bit length of the corresponding data may be equal to the bit length of the identification data or may be different from the bit length of the identification data. For example, the corresponding data may be data, for example, obtained by shortening or expending identification data of a first bit length supplied from the active pen 2 to data of a second bit length corresponding to the number of active pens 2 supported by the sensor controller 41. Further, the sensor controller 41 is configured such that, in the case where it thereafter detects a second active pen 2, it changes the detected flag D3b from "0" to "1" and sets corresponding data corresponding to the identification data of the second active pen 2 as the corresponding data D4a in the multi uplink signal M/U.

It is to be noted that, the sensor controller 41 may be configured otherwise such that it deploys data of one bit indicative of the number of active pens 2 being detected by the sensor controller 41 into the multi uplink signal M/U in place of the detected flags D3a and D3b. This makes it possible to reduce the size of the multi uplink signal M/U by one bit.

Further, the sensor controller 41 transmits a ping signal P (refer to FIGS. 4 to 6 hereinafter described) as the uplink signal US in addition to the command signal C and the multi uplink signal M/U in some cases. The ping signal P is a signal for notifying an active pen 2 of a transmission timing of a downlink signal DS and is, for example, a burst signal having a time length corresponding to one bit.

Referring back to FIG. 1, the downlink signal DS is a signal configured from data whose transmission is instructed by the command signal C (burst data or default data) or a carrier signal modulated with identification data of the active pen 2. In the following description, the downlink signal DS modulated with burst data is referred to as "burst signal," the downlink signal DS modulated with default data is referred to as "data signal," and the downlink signal DS modulated with identification data is referred to as "response signal." Processes of the sensor controller 41 when it receives the signals mentioned are hereinafter described.

In order to make it possible for the downlink signal DS to be received by the sensor controller 41, it is necessary that the active pen 2 to be positioned in the proximity of the panel face to such a degree that the downlink signal DS reaches the sensor controller 41. A sensing range SR indicated by a broken line in FIG. 1 schematically indicates a range within which the downlink signal DS can be detected by the sensor controller 41. In the case where the active pen 2 advances into the sensing range SR, the sensor controller 41 is enabled to detect the downlink signal DS through the sensor 40. "Down" described above signifies, in regard to the active pen 2, such a movement that it moves from the outside to the inside of the sensing range SR. A state in which, although the active pen 2 enters the sensing range SR by the down, it does not contact with the panel face as yet is called "hover state."

On the other hand, even in the case where the active pen 2 is outside the sensing range SR, it can sometimes receive an uplink signal US transmitted from the sensor controller 41. This is because the uplink signal US can be transmitted using all of the electrodes disposed in a matrix in parallel to the panel face or part of the electrodes in a wide area and can be transmitted with a high strength in comparison with the downlink signal DS transmitted from an active pen 2 using an electrode 21 hereinafter described. An uplink detection height AH depicted in FIG. 1 indicates a limit in height (distance from the panel face) at which the active pen 2 can receive the uplink signal US. The uplink detection height AH is a position higher than an upper limit of the sensing range SR (position farther from the panel face).

FIG. 3 is a view depicting a configuration of the active pen 2. As depicted in FIG. 3, the active pen 2 is configured including an electrode 21 provided at the pen tip, a memory 22, a processor 23, a switch 24, and an indicator 25. Though not depicted, the components are electrically connected to each other in the inside of the active pen 2.

The electrode 21 is member formed from a conductor and functions as an antenna for allowing the active pen 2 to receive an uplink signal US hereinafter described and transmit a downlink signal DS hereinafter described. An electrode for receiving an uplink signal US and an electrode for transmitting a downlink signal DS may be provided separately from each other. As an alternative, a member that contacts directly with the panel face (pen tip member) may have conductivity such that it forms the electrode 21, or a conductor member may be disposed in the proximity of a pen tip member to configure the electrode 21.

The memory 22 is a storage device that stores various kinds of data relating to an active pen 2. The data stored in the memory 22 include a program for controlling operation of the processor 23, identification data for distinguishing an active pen 2 from the other active pens 2, and data temporarily written in by the processor 23 (data to be transmitted by a downlink signal DS, data to be indicated by the indicator 25, and so forth).

Here, the identification stored in the memory 22 may be any data with which active pens 2 used simultaneously on the same electronic apparatus 4 can be distinguished from each other. For example, the identification data may be a stylus unique ID of a given length allocated in advance to each active pen 2 or a value of a bit number equal to or smaller than a given number of bits determined based on the stylus unique ID (for example, a hash value obtained by substituting the stylus unique ID into a predetermined hash function). As an alternative, the identification data may be a numerical value determined at random by the processor 23 or may be color information hereinafter described or setting information set from the outside to the active pen 2 like a type of a brush.

The processor 23 is a microprocessor that operates by executing a program stored in the memory 22. The processor 23 is configured such that it receives an uplink signal US arriving at the electrode 21 and executes a process according to the uplink signal US. This process includes a process for transmitting a downlink signal DS through the electrode 21. Further, the processor 23 performs also a process according to an on/off state of the switch 24 (including an acquisition process of switch data indicative of an on/off state of the switch 24), a control process of indication contents of the indicator 25, a process for acquiring writing pressure data indicative of a pressure (voltage) applied to the pen tip from a writing pressure sensor, and so forth.

The switch 24 is a switch configured for on/off by a user. While FIG. 2 depicts an example in which the switch 24 is formed on a side face of the active pen 2, the switch 24 may be provided at a different portion such as, for example, a terminal end portion. Further, not one but a plurality of switches 24 may be provided.

The indicator 25 is an apparatus ready for identification data and is used to notify the user of the active pen 2 of the identification data. While FIG. 3 depicts an example in which the indicator 25 is configured from a small-sized display, the indicator 25 may otherwise be configured from a mechanically controllable member.

What is indicated on the indicator 25 in the example of FIG. 3 is identification data that is color information. In the following, identification data that is color information is described particularly.

A user usually performs inputting to the electronic apparatus 4 by an active pen 2 in a state in which some drawing application is activated. Some drawing application is configured such that it can set a drawing color different for each active pen 2. For example, in the case where red is set in association with the active pen 2a and blue is set in association with the active pen 2b, the drawing application is configured such that a locus of the active pen 2a (for example, the loci st1 and st2 depicted in FIG. 1) is drawn in red and a locus of the active pen 2b (for example, the locus st3 depicted in FIG. 1) is drawn in blue.

The color information is information indicative of this drawing color. The color information of each active pen 2 is acquired by the processor 23 from a notification from the electronic apparatus 4 with an uplink signal US or from a notification by an operation of the switch 24 by the user. The processor 23 is configured such that it notifies the user of the color information acquired in this manner through the indicator 25. It is to be noted that, while FIG. 3 depicts an example in which color information is notified by displaying a character indicative of the color on the indicator 25, the display color of the indicator 25 may be used for the notification of the color information.

Now, referring back to FIG. 1, a configuration of the electronic apparatus 4 is described in detail.

The liquid crystal display device 44 is an apparatus that includes, though not depicted, pluralities of pixel electrodes and liquid crystal layer disposed in a matrix, and a common electrode. The host processor 43 is configured such that it controls the potential of each pixel electrode in a state in which the potential of the common electrode is kept at a predetermined value (for example, a pixel driving potential Vcom depicted in FIG. 3) to perform arbitrary display on the liquid crystal display device 44.

Figure 5:
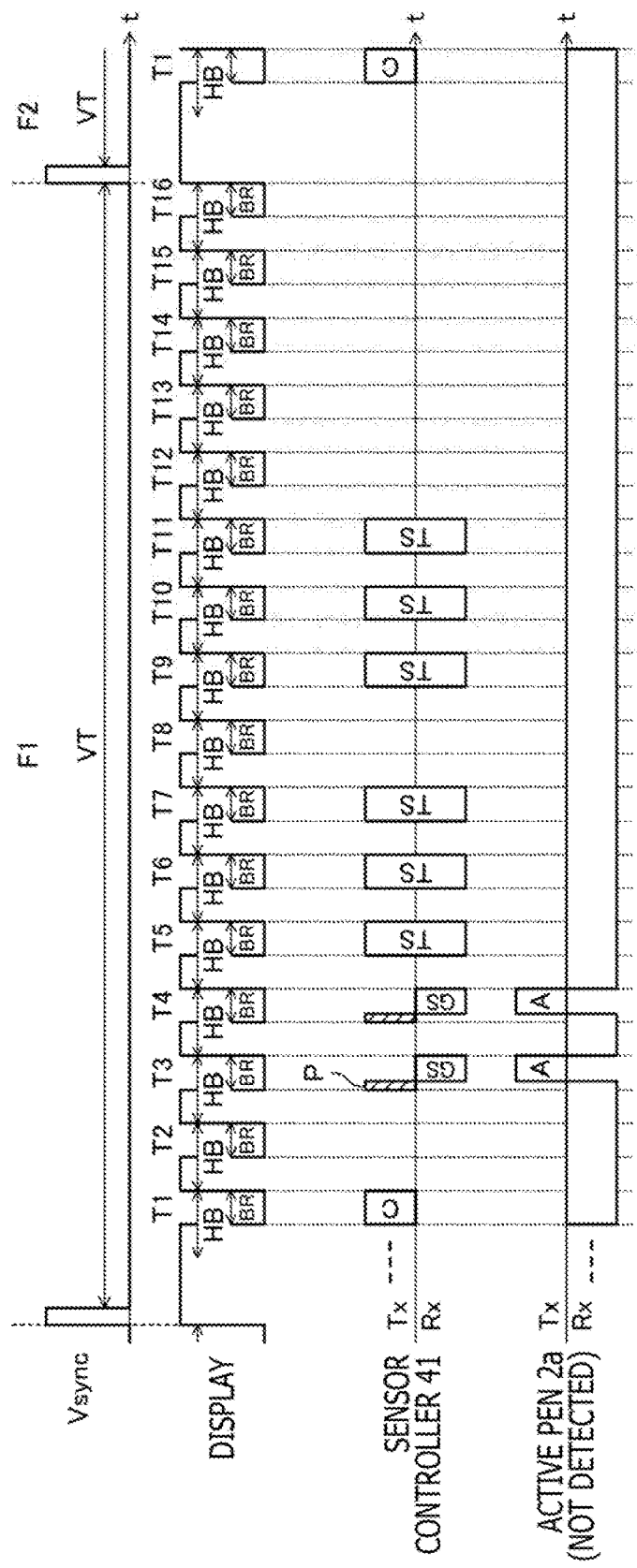
FIG. 5 is a view illustrating control of a liquid crystal display device performed by a host processor according to the embodiment of the present disclosure and communication performed between the sensor controller and the active pen according to the embodiment of the present disclosure.

FIG. 5 depicts an example of control of the liquid crystal display device 44 performed by the host processor 43. As depicted in FIG. 5, the host processor 43 is configured for generation, in the inside thereof, of a synchronizing signal Vsync that is activated in a predetermined interval VT and performs control of the liquid crystal display device 44 in a unit of a frame where the period of the synchronizing signal Vsync is one frame. FIG. 5 depicts two frames F1 and F2.

In the first frame, a plurality of horizontal blanking periods HB are deployed. Within the front half of each horizontal blanking period HB, a driving process of pixels by the host processor 43 is executed. On the other hand, within the rear half of the horizontal blanking period HB, a process for returning a pixel of a driving target from the right end to the left end of a screen (or a predetermined region where the screen is divided into a plurality of regions) is performed. During this process, the driving process of pixels by the host processor 43 is placed in a dormant state. In the following description, a period within which the driving process is in a dormant state is referred to as blank period BP.

Referring back to FIG. 1, the panel 42 is a transparent plate made of glass or plastics, and the sensor 40 is disposed between the panel 42 and the liquid crystal display device 44. The sensor controller 41 is configured such that it executes communication with an active pen 2 and detection of a finger 3 through the sensor 40.

FIG. 4 is a view depicting a configuration of the sensor 40 and the sensor controller 41. In the following, a configuration and operation of the sensor 40 and the sensor controller 41 are described in detail with reference to FIG. 4.

The sensor 40 is configured such that a plurality of sensor electrodes 40X that are transparent conductors individually extending in a Y direction and disposed at equal distances in an X direction orthogonal to the Y direction and a plurality of sensor electrodes 40Y that are transparent conductors individually extending in the X direction and disposed at equal distances in the Y direction are disposed in a matrix. The sensor 40 is configured such that a coupling capacitor is formed between any of the sensor electrodes 40X and 40Y and the active pen 2 or the finger 3. It is to be noted that, although an example in which each of the sensor electrodes 40X and 40Y here is configured from a linear conductor is depicted, also it is possible to configure the sensor electrodes 40X and 40Y from conductors of some other shape. For example, the sensor electrodes 40X or 40Y may be configured from a plurality of rectangular conductors disposed two-dimensionally such that two-dimensional coordinates of a stylus can be detected.

The sensor electrodes 40X or 40Y can be used also as the common electrode of the liquid crystal display device 44 described hereinabove. The electronic apparatus 4 that uses the sensor electrodes 40X or 40Y as a common electrode of the liquid crystal display device 44 is called, for example, "in-cell type" electronic apparatus. On the other hand, the electronic apparatus 4 provided with the sensor electrodes 40X and 40Y and the common electrode of the liquid crystal display device 44 separately is called, for example, "out-cell type" electronic apparatus. Although the following description is given assuming that the electronic apparatus 4 is of the in-cell type, the present disclosure can be applied also to an electronic apparatus 4 of the out-cell type. Further, although the following description is given assuming that the sensor electrodes 40X are used as a common electrode of the liquid crystal display device 44, it is needless to say that the sensor electrodes 40Y may be used as a common electrode of the liquid crystal display device 44.

When the host processor 43 executes a driving process for the pixels, it is necessary to keep the potential of the common electrode to a predetermined value. Accordingly, in the electronic apparatus 4 of the in-cell type, while the host processor 43 is executing a driving process for the pixels, the sensor controller 41 cannot perform communication with an active pen 2 and detection of a finger 3. Therefore, the host processor 43 uses the blank period BP depicted in FIG. 5 to cause the sensor controller 41 to execute communication with an active pen 2 and detection of a finger 3. In particular, the sensor controller 41 assumes each of a plurality of blank periods BP existing in one frame as a time slot and controls the sensor controller 41 to execute communication with an active pen 2 and detection of a finger 3 within the time slot.

FIG. 5 depicts an example in which 16 blank periods BP exist in one frame. The sensor controller 41 assumes the 16 blank periods BP as 16 time slots T1 to T16 and utilizes the time slots T1 to T16 to execute communication with an active pen 2 and detection of a finger 3. It is to be noted that, while description of the present embodiment is given taking a case in which 16 blank periods BP exist in one frame as an example, similar control is performed also in a case in which the number of blank periods BP in one frame is not 16.

Referring back to FIG. 4, the sensor controller 41 is configured including microcontroller unit (MCU) 50, a logic circuit 51, transmitters 52 and 53, a receiver 54, and a selection device 55.

The MCU 50 and the logic circuits 51 control transmission and reception operations of the sensor controller 41 by controlling the transmitters 52 and 53, receiver 54, and selection device 55. In particular, the MCU 50 is a microprocessor that includes a read only memory (ROM) and a random access memory (RAM) in the inside thereof and operates by executing a program stored in them. The MCU 50 has a function also for outputting a pixel driving potential Vcom to be supplied to the sensor electrodes 40X as a common electrode and data DATA to be supplied as an uplink signal US upon pixel driving of the liquid crystal display device 44. Meanwhile, the logic circuit 51 is configured to output control signals ctrl_t1, ctrl_t2, and ctrL_r under the control of the MCU 50.

The transmitter 52 is a device that generates a finger detection signal FDS to be used for detection of a finger 3 under the control of the MCU 50. The finger detection signal FDS may be, for example, a non-modulated pulse train signal or sine wave signal.

The transmitter 53 is a device that generates an uplink signal US under the control of the MCU 50 and the logic circuit 51 and is configured including a code train retention circuit 60, a spread processing circuit 61, and a transmission guard circuit 62 as depicted in FIG. 3.

The spread processing circuit 61 has two input terminals and one output terminal, and data DATA is supplied from the MCU 50 to one of the input terminals while a spread code PN is supplied from the code train retention circuit 60 to the other input terminal.

The data DATA is data of a plurality of bits deployed in the uplink signal US. When the MCU 50 is to transmit a command signal C, it generates a command D1 and an extension flag D2 depicted in FIG. 2A and supplies them as data DATA to the spread processing circuit 61. On the other hand, when a multi uplink signal M/U is to be transmitted, the MCU 50 generates detected flags D3a and D3b and corresponding data D4a and D4b depicted in FIG. 2B and supplies them as data DATA to the spread processing circuit 61.

The spread code PN is data of a predetermined bit length having an autocorrelation characteristic. The code train retention circuit 60 has a function of generating and retaining the spread code PN under the control of the control signal ctrl_t1 supplied from the logic circuit 51.

The spread processing circuit 61 has a function for modulating, based on data DATA supplied to one of the input terminals thereof, the spread code PN supplied to the other input terminal thereof to acquire a transmission chip train of a predetermined chip length. The transmission chip train acquired by the spread processing circuit 61 is supplied to the transmission guard circuit 62.

The transmission guard circuit 62 has a function for inserting a guard period (period within which neither transmission nor reception is performed), which is necessitated to perform switching between a transmission operation and a reception operation, between a transmission period of an uplink signal US and a reception period of a downlink signal DS under the control of the control signal ctrl_t2 supplied thereto from the logic circuit 51.

The receiver 54 is a device for receiving the downlink signal DS transmitted from an active pen 2 or a finger detection signal FDS transmitted from the transmitter 52 under the control of the control signal ctrl_r of the logic circuit 51. In particular, the receiver 54 is configured including an amplification circuit 65, a detection circuit 66, and an analog to digital (AD) converter 67.

The amplification circuit 65 amplifies and outputs the downlink signal DS or a finger detection signal FDS supplied from the selection device 55. The detection circuit 66 is a circuit that generates a voltage corresponding to the level of an output signal of the amplification circuit 65. The AD converter 67 is a circuit that samples a voltage outputted from the detection circuit 66 at predetermined intervals of time to generate a digital signal. The digital signal outputted from the AD converter 67 is supplied to the MCU 50. The MCU 50 performs, based on the digital signal supplied thereto in this manner, position detection of an active pen 2 or a finger 3 and acquisition of data Res transmitted from the active pen 2 (identification data or default data described above or the like). The MCU 50 outputs coordinates x, y indicative of the detected position and the acquired data Res sequentially to the host processor 43. Further, in the case where the MCU 50 acquires identification data, it performs a process for changing its own operation mode. This is hereinafter described in detail.

The selection device 55 is configured including switches 68x and 68y and conductor selection circuits 69x and 69y.

The switch 68y is a switch element configured such that a common terminal and one of a terminal T and a terminal R thereof are connected to each other. The common terminal of the switch 68y is connected to the conductor selection circuit 69y and the terminal T is connected to an output terminal of the transmitter 53 while the terminal R is connected to an input terminal of the receiver 54. Meanwhile, the switch 68x is a switch element configured such that a common terminal and one of a terminal T1, a terminal T2, a terminal D, and a terminal R thereof are connected to each other. The common terminal of the switch 68x is connected to the conductor selection circuit 69x and the terminal T1 is connected to an output terminal of the transmitter 53; the terminal T2 is connected to an output terminal of the transmitter 52; the terminal D is connected to an output terminal of the MCU 50 from which the pixel driving potential Vcom is outputted; and the terminal R is connected to an input terminal of the receiver 54.

The conductor selection circuit 69x is a switch element for selectively connecting the plurality of sensor electrodes 40X to the common terminal of the switch 68x. The conductor selection circuit 69x is configured such that also it can simultaneously connect part or all of the plurality of sensor electrodes 40X to the common terminal of the switch 68x.

The conductor selection circuit 69y is a switch element for selectively connecting the plurality of sensor electrodes 40Y to the common terminal of the switch 68y. Also the conductor selection circuit 69y is configured such that also it can simultaneously connect part or all of the plurality of sensor electrodes 40Y to the common terminal of the switch 68y.

To the selection device 55, four control signals sTRx, sTRy, selX, and selY are supplied from the logic circuit 51. In particular, the control signal sTRx is supplied to the switch 68x; the control signal sTRy is supplied to the switch 68y; the control signal selX is supplied to the conductor selection circuit 69x; and the control signal selY is supplied to the conductor selection circuit 69y. The logic circuit 51 controls the selection device 55 using the control signals sTRx, sTRy, selX, and selY to implement transmission of an uplink signal US or a finger detection signal FDS and application of a pixel driving potential Vcom as well as reception of a downlink signal DS or a finger detection signal FDS.

In the following, control contents of the selection device 55 by the logic circuit 51 and operation of the MCU 50 receiving the control contents are described in detail separately in regard to those upon execution of detection of a finger 3, upon execution of pixel driving operation, upon transmission of an uplink signal US, and upon reception of a downlink signal DS.

First, upon detection of a finger 3, the logic circuit 51 controls the switch 68x such that the terminal T2 is connected to the common terminal and controls the switch 68y such that the terminal R is connected to the common terminal. Further, the logic circuit 51 controls the conductor selection circuits 69x and 69y such that combinations of pluralities of sensor electrodes 40X and 40Y are successively selected. By this control, the finger detection signals FDS that pass a plurality of cross points configured from the pluralities of sensor electrodes 40X and 40Y are successively received by the receiver 54. The MCU 50 detects the position of the finger 3 on the panel face based on the reception strength of the finger detection signals FDS successively received in this manner.

Further, upon execution of pixel driving operation, the logic circuit 51 controls the switch 68x such that the terminal D is connected to the common terminal and controls the conductor selection circuit 69x such that all of the plurality of sensor electrodes 40X are simultaneously connected to the switch 68x. Consequently, the pixel driving potential Vcom is supplied from the MCU 50 to the sensor electrodes 40X, and therefore, execution of pixel driving operation by the host processor 43 is enabled. It is to be noted that the MCU 50 causes the logic circuit 51 to perform the control described above at a timing based on a timing signal supplied from the host processor 43.

Further, upon transmission of an uplink signal US, the logic circuit 51 controls the switch 68x such that the terminal T1 is connected to the common terminal and controls the switch 68y such that the terminal T is connected to the common terminal. Furthermore, the logic circuit 51 controls the conductor selection circuits 69x and 69y such that all of the pluralities of sensor electrodes 40X and 40Y are selected simultaneously. Consequently, an uplink signal US is transmitted from all of the pluralities of sensor electrodes 40X and 40Y.

Finally, upon reception of a downlink signal DS, the logic circuit 51 controls the switches 68x and 68y such that the terminal R is connected to the common terminal. The control method for the conductor selection circuits 69x and 69y differs depending upon the type of a downlink signal DS to be received.

In particular, in the case where a downlink signal DS that is a burst signal or a response signal is to be received, the logic circuit 51 controls the conductor selection circuits 69x and 69y such that combinations of the pluralities of sensor electrodes 40X and 40Y are successively selected. In the following description, such a control method of the conductor selection circuits 69x and 69y as described above is referred to as "global scan." By performing global scan, burst signals or response signals that individually pass the plurality of cross points configured from the pluralities of sensor electrodes 40X and 40Y are successively received by the receiver 54. The MCU 50 detects the position of the active pen 2 on the panel face based on the reception strength of the burst signals successively received in this manner. Further, the MCU 50 decodes a response signal supplied from the receiver 54 to acquire identification data included in the response signal.

Meanwhile, in the case where a downlink signal DS that is a data signal is to be received, the logic circuit 51 controls the conductor selection circuits 69x and 69y such that only a predetermined number of ones (for example, one) of the pluralities of the sensor electrodes 40X and 40Y, which are located in the proximity of the latest position detected based on the burst signal transmitted from the active pen 2 that is a transmission source of the data signal. In the following description, such a control method of the conductor selection circuits 69x and 69y is referred to as "local scan." A data signal received by the predetermined number of selected sensor electrodes is supplied to the MCU 50 through the receiver 54. The MCU 50 decodes the data signal supplied in this manner to acquire data transmitted from an active pen 2.

An overview of the entire position detection system 1 according to the present embodiment has been described. Now, a characteristic portion of the configuration of the position detection system 1, which is characteristic to the present disclosure, is described in more detail.

Figure 6:
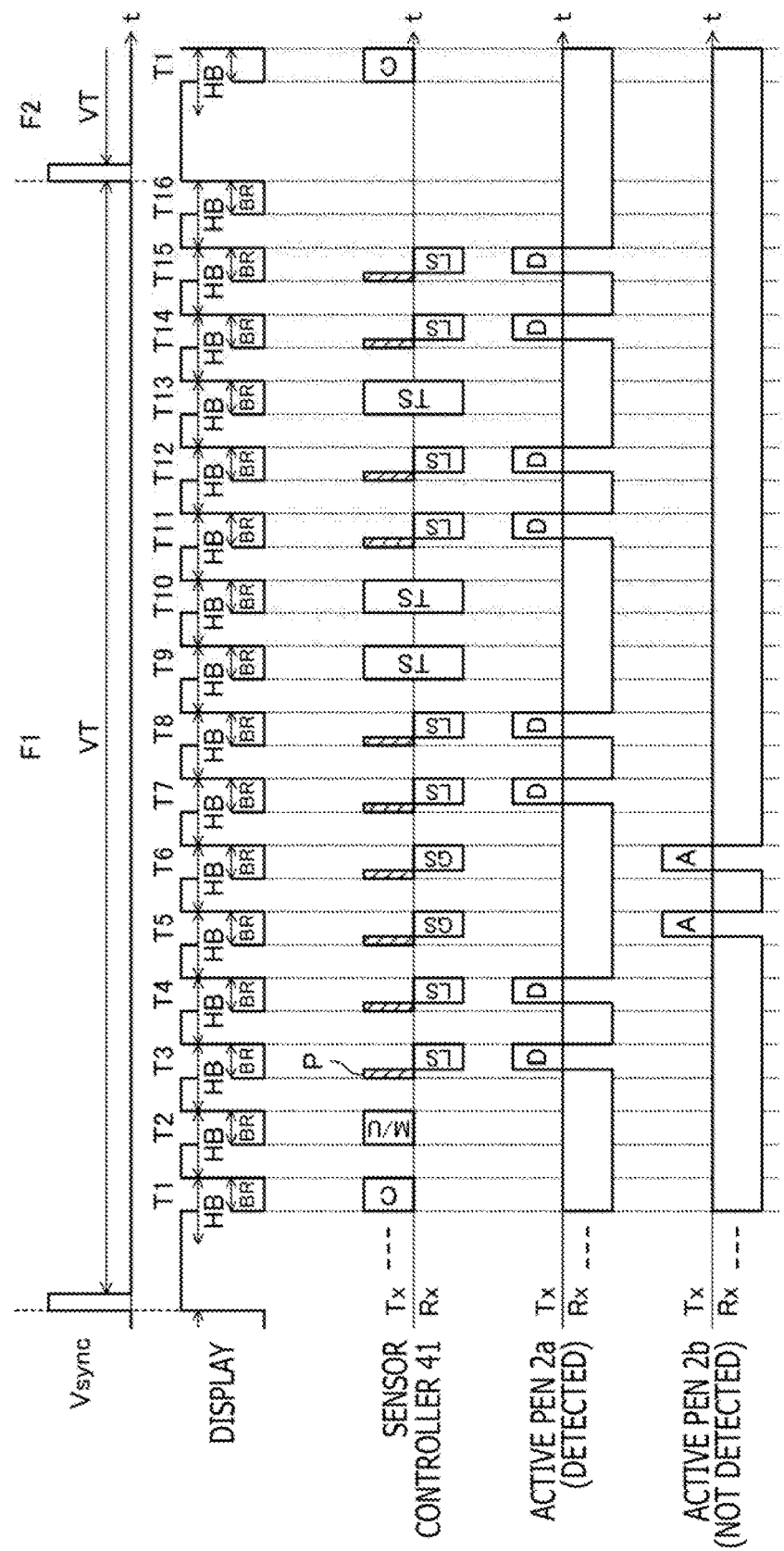
FIG. 6 is another view illustrating control of the liquid crystal display device performed by the host processor according to the embodiment of the present disclosure and the communication performed between the sensor controller and the active pen according to the embodiment of the present disclosure.
Figure 7:
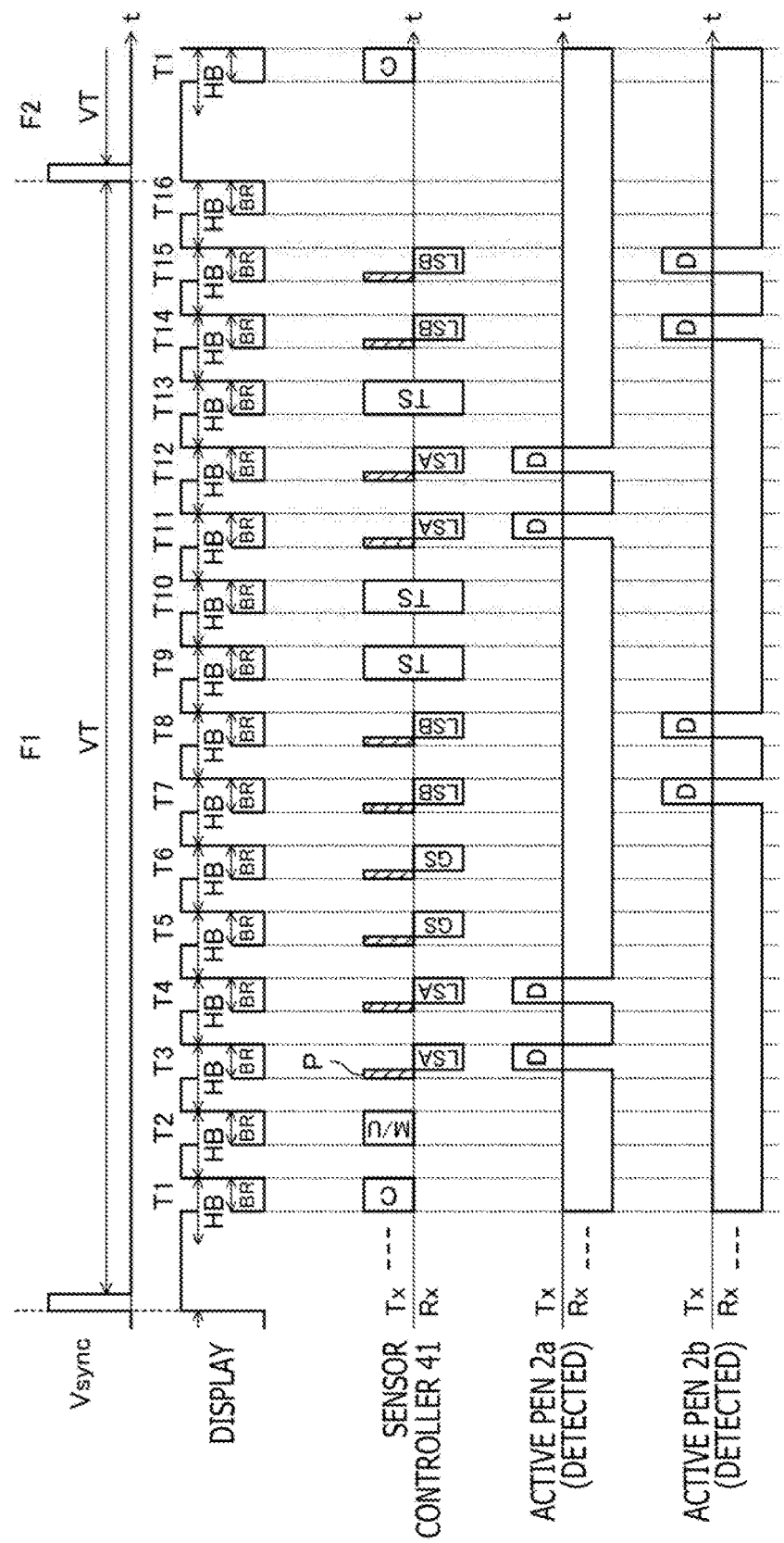
FIG. 7 is still another view illustrating control of the liquid crystal display device performed by the host processor according to the embodiment of the present disclosure and the communication performed between the sensor controller and the active pen according to the embodiment of the present disclosure.

FIGS. 5 to 7 individually depict control of the liquid crystal display device 44 performed by the host processor 43 and communication performed between the sensor controller 41 and an active pen 2. FIG. 5 depicts a case in which the active pen 2a is detected newly from a state in which no active pen 2 is detected by the sensor controller 41; FIG. 6 depicts a case in which the active pen 2b is detected further by the sensor controller 41; and FIG. 7 depicts a case in which the active pens 2a and 2b are detected already by the sensor controller 41.

First, operation modes of the sensor controller 41 are described.

As depicted in FIG. 5, the sensor controller 41 that is in a state in which it detects no active pen 2 transmits a command signal C in a time slot T1, carries out transmission of a ping signal P and global scan (GS) in time slots T3 and T4, and carries out a detection operation (TS) of a finger 3 in time slots T5 to T7 and T9 to T11. In the following description, the operation mode of the sensor controller 41 in which it operates in such a transmission and reception schedule as just described is referred to as "global mode."

Further, as depicted in FIG. 6, the sensor controller 41 that is in a state in which it detects only one active pen 2 transmits a command signal C in a time slot T1, transmits a multi uplink signal M/U in a time slot T2, carries out transmission of a ping signal P and local scan (LS) in time slots T3, T4, T7, T8, T11, T12, T14, and T15, carries out transmission of a ping signal P and global scan (GS) in time slots T5 and T6, and carries out a detection operation (TS) of a finger 3 in time slots T9, T10, and T13. In the following description, the operation mode of the sensor controller 41 in which it operates in such a transmission and reception schedule as just described is referred to as "full mode."

Furthermore, as depicted in FIG. 7, the sensor controller 41 that is in a state in which it detects two active pens 2 transmits a command signal C in the time slot T1, transmits a multi uplink signal M/U in a time slot T2, carries out transmission of a ping signal P and local scan (LSA) for a first active pen 2 in the time slots T3, T4, T11, and T12, carries out transmission of a ping signal P and local scan (LSB) for a second active pen 2 in the time slots T7, T8, T14, and T15, carries out transmission of a ping signal P and global scan (GS) in the time slots T5 and T6, and carries out detection operation (TS) of a finger 3 in the time slots T9, T10, and T13. In the following description, the operation mode of the sensor controller 41 in which it operates in such a transmission and reception schedule as just described is referred to as "two-pen mode."

Referring first to FIG. 5, if the active pen 2a that is not detected by the sensor controller 41 as yet receives a command signal C transmitted from the sensor controller 41, then it acquires deployment of time slots from data included in the command signal C. Then, the active pen 2a tries to receive the multi uplink signal M/U at a timing corresponding to the time slot T2. In the example of FIG. 5, since the sensor controller 41 does not transmit the multi uplink signal M/U, the active pen 2a does not receive a multi uplink signal M/U.

The active pen 2a having decided that a multi uplink signal M/U is not received in the time slot T2 decides that the operation mode of the sensor controller 41 is the "global mode" and sets its own operation mode to the "global mode" in response to the decision. The global mode of an active pen 2 is a mode in which a command signal C is received in the time slot T1, a multi uplink signal M/U is received in the time slot T2, and transmission of a response signal and a burst signal are performed in the time slots T3 and T4.

The active pen 2a having set its own operation mode to the global mode performs transmission of a response signal and a burst signal using the time slots T3 and T4 (in FIGS. 5 to 7, the burst signal and the response signal are collectively represented as "A"). It is to be noted that, although the active pen 2a at this time performs transmission operation in response to reception of the ping signal P, even in the case where a ping signal P is not received, the active pen 2a may perform transmission operation similarly. This is because, since the active pen 2a has acquired deployment of time slots already by reception of the command signal C, it can transmit a response signal and a burst signal in the time slots T3 and T4 without relying upon a ping signal P. This similarly applies also to a case in which transmission of a downlink signal DS is performed at a different timing.

The sensor controller 41 receives a response signal and a burst signal transmitted from the active pen 2a by global scan. Then, the sensor controller 41 acquires identification data included in the response signal and detects the position of the active pen 2a on the panel face based on reception strengths of the burst signal by the sensor electrodes. The sensor controller 41 registers the acquired identification data and the detected position in a mutually associated relationship into its own memory (not depicted) and outputs them to the host processor 43. Further, the sensor controller 41 having detected the first active pen 2a in this manner changes its own operation mode to the full mode described above.

The command signal C transmitted from the sensor controller 41 in the full mode is a signal to which "1" indicating that one or more active pens 2 are being detected is set to the extension flag D2. Meanwhile, the multi uplink signal M/U is a signal in which "1" is set to one of the detected flags D3a and D3b while "0" is set to the other one of the detected flags D3a and D3b and, to the one of the corresponding data D4a and D4b corresponding to "1," corresponding data corresponding to the identification data of the active pen 2 being detected (acquired from the response signal) is set. To the other of the corresponding data D4a and D4b, an initial value "00000" is set.

The active pen 2a in the global mode tries to receive a multi uplink signal M/U after it receives the command signal C in a frame next to the frame in which the response signal and the burst signal have been transmitted. In the example of FIG. 6, since the sensor controller 41 transmits a multi uplink signal M/U, the active pen 2a receives the multi uplink signal M/U.

The active pen 2a receiving the multi uplink signal M/U first refers to the detected flags D3a and D3b included in the multi uplink signal M/U to acquire the number of active pens 2 being detected by the sensor controller 41. Then, in the case where the acquired number of active pens 2 is "1," the active pen 2a decides that the sensor controller 41 is in the full mode, but in the case where the acquired number of active pens 2 is "2," the active pen 2a decides that the sensor controller 41 is in the two-pen mode.

In the example of FIG. 6, the active pen 2a decides that the sensor controller 41 is in the full mode. The active pen 2a having made this decision changes its own operation mode to the "full mode." The full mode of an active pen 2 is a mode in which a command signal C is received in the time slot T1 and a multi uplink signal M/U is received in the time slot T2, whereafter a data signal is transmitted in the time slots T3, T4, T7, T8, T11, T12, T14, and T15 (in FIGS. 5 to 7, the data signal is denoted by "D"), and a burst signal is transmitted in the time slots T5 and T6.

Further, the active pen 2a refers to the corresponding data D4a and D4b in the multi uplink signal M/U to decide whether or not the active pen 2a itself is detected by the sensor controller 41. As a result, in the case where it is decided that the active pen 2a itself is not detected, the active pen 2a performs re-transmission of a response signal and a burst signal in the time slots T5 and T6 (not depicted). At this time, although there is the possibility that a different active pen 2 may transmit a burst signal simultaneously in response to an instruction of the sensor controller 41, since usually the different active pen 2 is located at a different position on the panel face, the sensor controller 41 can distinguish and receive the response signal and the burst signal transmitted from the active pen 2a and the burst signal transmitted from the different active pen 2.

In the case where the active pen 2a decides that it itself is detected by the sensor controller 41, it refers to the command signal C having received in the time slot T1 to decide whether or not a command to the active pen 2a itself has been transmitted. As a result, in the case where transmission of burst data is indicated, the time slots T5 and T6 are used to perform transmission of a burst signal. On the other hand, in the case where transmission of default data is indicated, the time slots T3, T4, T7, T8, T11, T12, T14, and T15 are used to perform transmission of a data signal. In the case where the size of data to be transmitted is so great that the data cannot be transmitted fully in one frame, transmission of the data signal is continued also in a next frame. In the case where a command to the active pen 2a itself has not been transmitted, the active pen 2a waits for reception of a command signal C in a next frame.

The sensor controller 41 receives a burst signal transmitted from the active pen 2a by global scan and re-detects the position of the active pen 2a on the panel face based on the reception strength of the burst signal at the sensor electrodes. Then, the sensor controller 41 updates the position stored in the memory in an associated relationship with the identification data of the active pen 2a and outputs the position to the host processor 43. Further, the sensor controller 41 receives a data signal transmitted from the active pen 2a by local scan and outputs the received data to the host processor 43.

FIG. 6 depicts a case in which, while the sensor controller 41 is operating in the full mode, a second active pen 2b comes close to the panel face. In this case, the active pen 2b first sets its own mode to the full mode similarly as in the case of the active pen 2a described above. Then, as depicted in FIG. 6, the active pen 2b transmits a response signal and a burst signal in the time slots T5 and T6. The sensor controller 41 receiving the response signal and the burst signal by global scan acquires identification data included in the response signal and detects the position of the active pen 2b on the panel face of the reception strength of the burst signal at the sensor electrodes. The sensor controller 41 registers the identification data acquired and the position detected in this manner in an associated relationship with each other into its own memory and outputs them to the host processor 43. Further, the sensor controller 41 having detected the second active pen 2b in this manner changes its own operation mode to the two-pen mode.

The active pens 2a and 2b in the full mode individually try to receive a multi uplink signal M/U after they receive a command signal C in a next frame. In the example of FIG. 7, the active pens 2a and 2b receive a same multi uplink signal M/U.

The active pens 2a and 2b having received the multi uplink signal M/U first refer to the detected flags D3a and D3b included in the multi uplink signal M/U to acquire the number of active pens 2 being detected by the sensor controller 41. Since, in the example of FIG. 7, the number of active pens 2 is "2," each of the active pens 2a and 2b decides that the sensor controller 41 is in the two-pen mode.

The active pens 2a and 2b further refer to the corresponding data D4a and D4b to decide whether or not they themselves are detected by the sensor controller 41. As a result, if it is decided that they are not detected, then the active pens 2a and 2b abandon the communication with the sensor controller 41 and notify the users of this using, for example, the indicator 25. That two pieces of identification data other than its own identification data are notified by the multi uplink signal M/U signifies that the sensor controller 41 that is ready only for simultaneous use of two active pens 2 in the maximum already detects two active pens 2 other than the active pen 2 itself and it is disabled to cause the sensor controller 41 to detect the active pen 2 itself.

Each of the active pens 2a and 2b in the case where it decides that it itself is detected by the sensor controller 41 decides in which one of the corresponding data D4a and D4b corresponding data corresponding to its own identification data is included. As a result, in the case where it is decided that it is included in the corresponding data D4a, its own operation mode is changed to the "half mode A," but in the case where it is decided that the corresponding data is included in the corresponding data D4b, its own operation mode is changed to the "half mode B." The half mode A is a mode in which a command signal C is received in the time slot T1, a multi uplink signal M/U is received in the time slot T2, a data signal is transmitted in the time slots T3, T4, T11, and T12, and a burst signal is transmitted in the time slots T5 and T6. On the other hand, the half mode B is a mode in which a command signal C is received in the time slot T1, a multi uplink signal M/U is received in the time slot T2, a data signal is transmitted in the time slots T7, T8, T14, and T15, and a burst signal is transmitted in the time slots T5 and T6.

Thereafter, each of the active pens 2a and 2b refers to the command signal C received in the time slot T1 to decide whether or not a command to the active pen itself has been transmitted. As a result, in the case where transmission of burst data has been indicated, transmission of a burst signal is performed using the time slots T5 and T6. On the other hand, in the case where transmission of default data has been indicted, transmission of a data signal is performed using corresponding time slots for data signal transmission (in the half mode A, the time slots T3, T4, T11, and T12, and in the half mode B, the time slots T7, T8, T14, and T15). In the case where the size of data to be transmitted is so great that the data cannot be transmitted fully in one frame, transmission of the data signal is continued also in a next frame. In the case where a command to each of the active pens 2a and 2b itself has not been transmitted, reception of a command signal C in a next frame is awaited.

If burst signals transmitted from the active pens 2a and 2b are received by a global scan, then the sensor controller 41 re-detects the positions of the active pens 2, which are transmission sources of the burst signals, on the panel face based on the reception strength of the burst signals at the sensor electrodes. Then, the positions stored in an associated relationship with the identification data of the active pens 2 in the memory are updated and outputted to the host processor 43. Further, the sensor controller 41 receives data signals transmitted from the active pens 2a and 2b by a local scan and outputs the received data to the host processor 43.

As described above, according to the present embodiment, identification data is determined by the active pen 2 side, and a notification of identification data determined by an active pen 2 is issued to the sensor controller 41 by a response signal. Accordingly, it can be prevented that, in pairing between an active pen 2 and the sensor controller 41, same identification data is allocated to a plurality of active pens 2.

Further, according to the present embodiment, since each active pen 2 autonomously changes its own operation mode in response to a change of the number of active pens 2 detected by the sensor controller 41, the delay of a pairing process between an active pen 2 and the sensor controller 41 can be prevented in comparison with that in an alternative case in which the sensor controller 41 instructs each active pen 2 of a transmission and reception schedule.

Now, such operations as described above by the present embodiment are described in more detail again with reference to processing flows of an active pen 2 and the sensor controller 41. It is to be noted that the following description is given assuming the frame configuration described hereinabove with reference to FIGS. 5 to 7.

Figure 8:
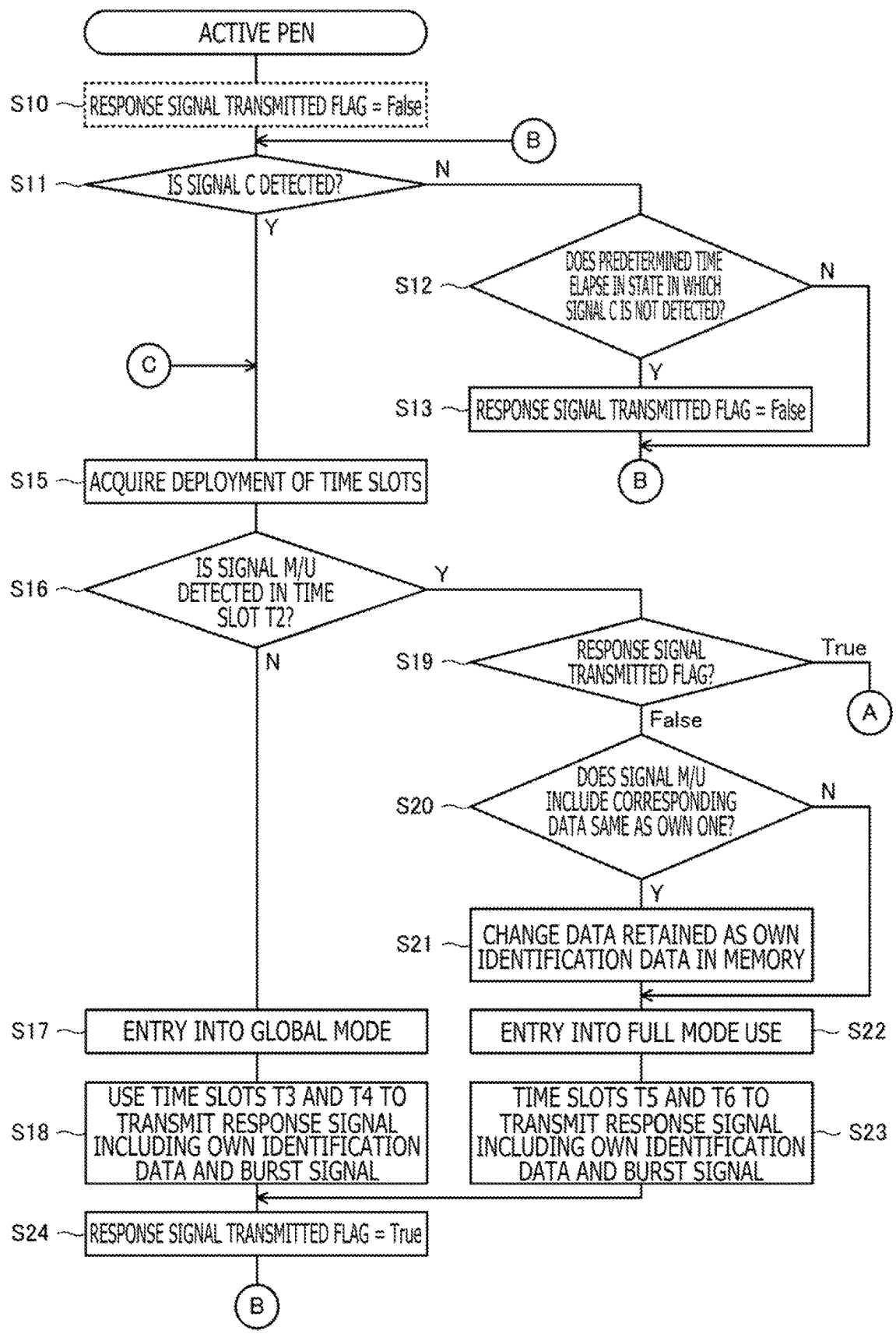
FIG. 8 is a flow chart depicting a process performed by a processor of the active pen according to the embodiment of the present disclosure.
Figure 9:
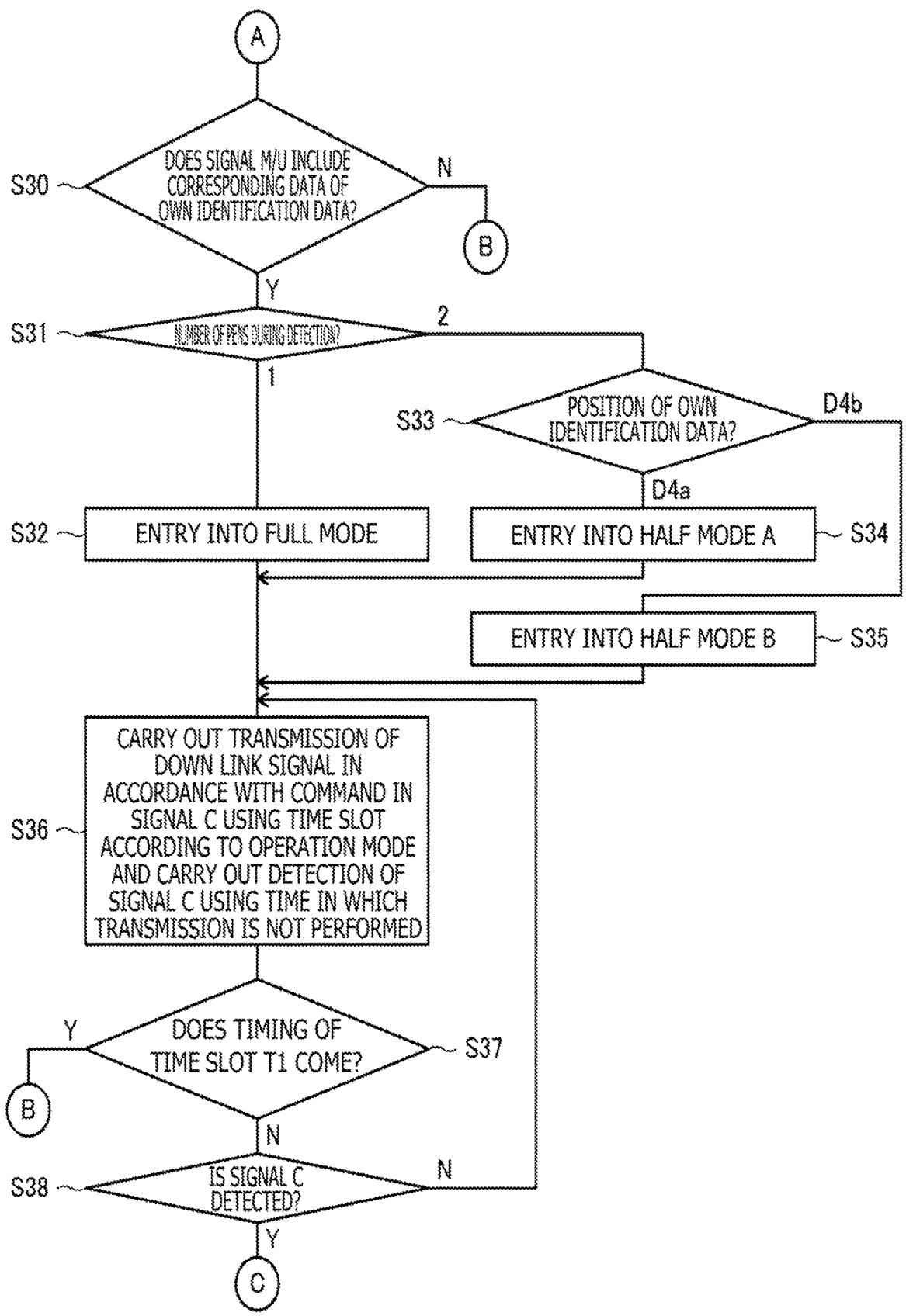
FIG. 9 is another flow chart depicting the process performed by the processor of the active pen according to the embodiment of the present disclosure.

FIGS. 8 and 9 are flow charts depicting processes performed by the processor 23 of an active pen 2. Here, a value of a "response signal transmitted flag" depicted at S10 of FIG. 8 is data stored in the memory 22. At a stage at which the power supply to the active pen 2 is made available, the response signal transmitted flag is in a state set to an initial value False (S10).

The processor 23 that starts its operation as the power supply is made available first performs a detection operation of a command signal C (S11). As a result, in the case where a command signal C is detected, the processor 23 decodes data included in the command signal C to acquire various information including deployment of time slots (S15). On the other hand, in the case where a command signal C is not detected, the processor 23 decides whether or not a predetermined period of time elapses in a state in which a command signal C is not detected (S12). Then, in the case where it is decided that the predetermined period of time does not elapse, the processing returns to S11, at which a detection operation of a command signal C is continuously performed. On the other hand, in the case where it is decided that the predetermined period of time elapses, the processor 23 sets the value False to the response signal transmitted flag (S13) and then returns the processing to S11 to continuously perform the detection operation of a command signal C. The process at S13 is a process for returning, when the active pen 2 is moved away from the panel face to such a degree that it cannot receive an uplink signal US, the response signal transmitted flag set to the value True at S24 hereinafter described to the original value of False.

After S15 is performed, the processor 23 performs a detection operation of a multi uplink signal M/U at a timing of the time slot T2 (S16). As a result, if a multi uplink signal M/U is not detected, then the processor 23 sets its own operation mode to the global mode (S17) and uses the time slots T3 and T4 to transmit a response signal and a burst signal including its own identification data (S18). Further, the processor 23 sets the value True to the response signal transmitted flag (S24) and then returns the processing to S11.

The processor 23 in the case where it detects a multi uplink signal M/U at S16 decides whether the value of the response signal transmitted flag is True or False (S19). As a result, in the case where it is decided that the value of the response signal transmitted flag is False, the processor 23 decides whether or not the multi uplink signal M/U includes data that is the same as corresponding data corresponding to its own identification data (S20). In the case where it is decided that the multi uplink signal M/U includes such data, the processor 23 changes the data retained as its own identification data in the memory 22 (S21). By the process at S21, it becomes possible to prevent that a plurality of active pens 2 transmit same identification data.

In the case where it is decided at S20 that the multi uplink signal M/U does not include such data as described above, or in the case where the process at S21 ends, the processor 23 sets its own operation mode to the full mode (S22) and uses the time slots T5 and T6 to transmit a response signal and a burst signal including its own identification data (S23). Further, the processor 23 sets the response signal transmitted flag to the value True (S24) and returns the processing to S11.

The processor 23 in the case where it is decided at S19 that the value of the response signal transmitted flag is True decides whether or not the multi uplink signal M/U includes the corresponding data of its own identification data as depicted in FIG. 9 (S30). As a result, in the case where it is decided that the multi uplink signal M/U does not include such corresponding data, the processor 23 decides that the sensor controller 41 does not detect the processor 23 itself as yet and returns the processing to S11. On the other hand, in the case where it is decided that the multi uplink signal M/U includes the corresponding data, the processor 23 decides that the sensor controller 41 detects the processor 23 itself and refers to the detected flags D3a and D3b in the multi uplink signal M/U to acquire the number of active pens 2 being detected by the sensor controller 41. Then, the processor 23 decides which one of 1 and 2 the acquired number is (S31).

In the case where it is decided at S31 that the acquired number is 1, the processor 23 sets its own operation mode to the full mode (S32). On the other hand, in the case where it is decided at S31 that the acquired number is 2, the processor 23 further decides in which one of the corresponding data D4a and D4b the corresponding data corresponding to its own identification data is included (S33). In the case where the corresponding data is included in the corresponding data D4a, the processor 23 sets its own operation mode to the half mode A (S34), but in the case where the corresponding data is included in the corresponding data D4b, the processor 23 sets its own operation mode to the half mode B (S35).

Here, that the processor 23 sets its own operation mode in such a manner as described above is equivalent to that the sensor controller 41 determines a transmission rate of the downlink signal DS in response to the number of active pens 2 being detected by the sensor controller 41. In particular, while, in the full mode, transmission of a downlink signal DS is performed using the eight time slots T3, T4, T7, T8, T11, T12, T14, and T15 as described hereinabove, in the half mode A and the half mode B, only four time slots can be used for transmission of a downlink signal DS, and therefore, the transmission rate is one half that in the case of the full mode. Accordingly, that the processor 23 sets the operation mode to the half mode A and the half mode B is equivalent to that the transmission rate of a downlink signal DS is determined to a value one half that in the case where the operation mode is set to the full mode.

Further, it can be considered that, according to such a setting method of the operation mode as described above, in the case where the multi uplink signal M/U indicates increase of the number of active pens 2 under detection, the processor 23 decreases the transmission rate for the downlink signal DS, but in the case where the multi uplink signal M/U indicates decrease of the number of active pens 2 under detection, the processor 23 increases the transmission rate for the downlink signal DS.

The processor 23 entering one of the operation modes at S32, S34, or S35 uses time slots according to the operation mode to carry out transmission of a downlink signal DS in accordance with a command in the command signal C and uses a period of time in which transmission is not performed to carry out detection of a command signal C (S36). While S36 is being carried out, if a timing for the time slot T1 of a next frame comes, then the processor 23 returns the processing to S11 of FIG. 8 (S37). Further, even before a timing for the time slot T1 of a next frame comes, in the case where a command signal C is detected, the processor 23 advances the processing to S15 of FIG. 8 (S38). Processing for the next frame is started in this manner.

Figure 10:
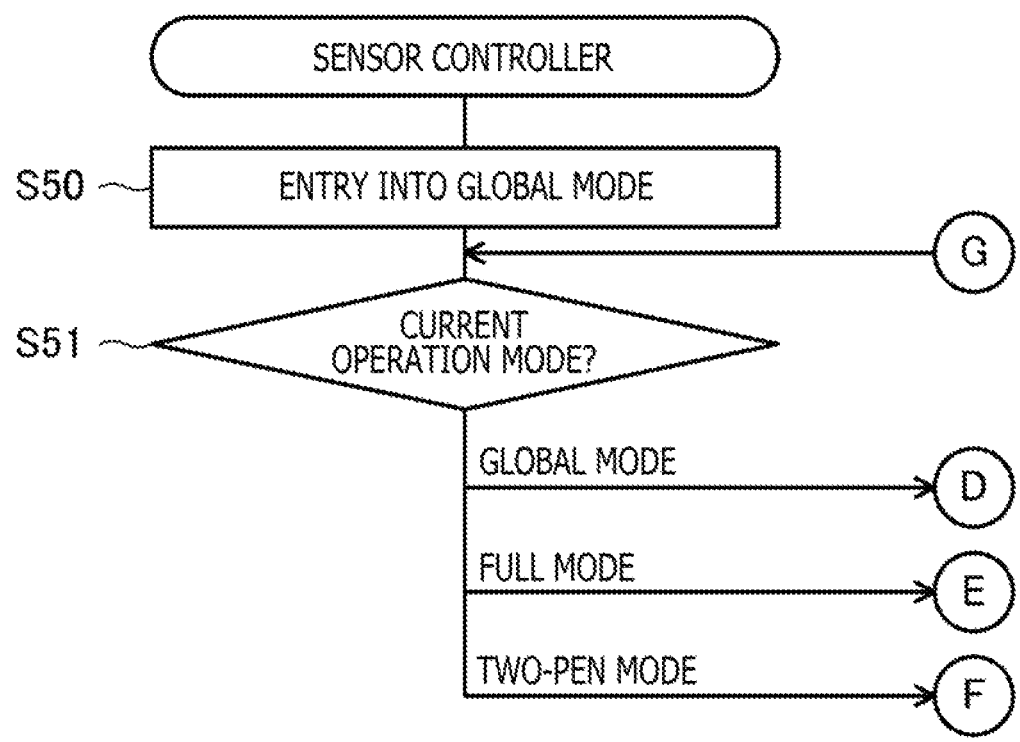
FIG. 10 is a flow chart depicting a process performed by the sensor controller according to the embodiment of the present disclosure.

FIGS. 10 to 13 are flow charts depicting processing performed by the sensor controller 41. The sensor controller 41 first sets its own operation mode to the global mode as depicted in FIG. 10 (S50). Then, the sensor controller 41 decides which one of the global mode, full mode, and two-pen mode the current operation mode is (S51).

Figure 11:
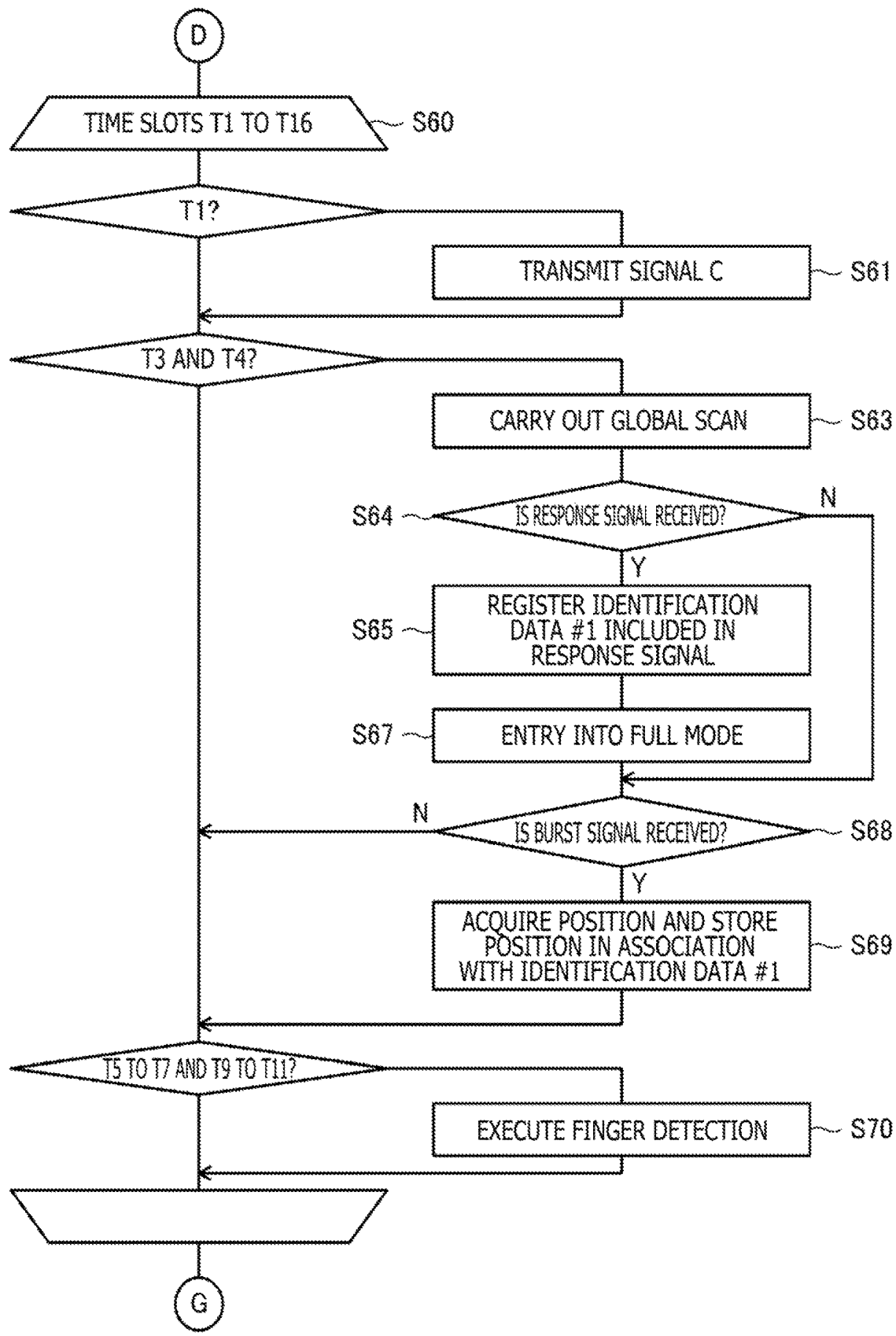
FIG. 11 is another flow chart depicting the process performed by the sensor controller according to the embodiment of the present disclosure.

FIG. 11 depicts processes for one frame in the case where it is decided at S51 that the current operation mode is the global mode. The processes performed in the time slots by the sensor controller 41 in this case are such as described below (S60).

In particular, the sensor controller 41 first performs transmission of a command signal C in the time slot T1 (S61: first uplink signal transmission).

Then, the sensor controller 41 carries out a global scan in the time slots T3 and T4 (S63: response signal detection). Then, the sensor controller 41 decides whether or not a response signal is received (S64), and only in the case where it is decided that a response signal is received, the sensor controller 41 extracts identification data (hereinafter referred to as identification data #1) included in the response signal and registers the identification data into its own memory (S65: identification data extraction) and also sets its own operation mode to the full mode (S67: transmission and reception schedule changing). Further, the sensor controller 41 decides whether or not a burst signal is received (S68), and only in the case where it is decided that a burst signal is received, the sensor controller 41 acquires the position of the active pen 2 on the panel face based on the reception strength of the burst signal at the pluralities of sensor electrodes 40X and 40Y and stores the position in an associated relationship with the identification data #1 (S69). Though not depicted, the sensor controller 41 performs also a process for outputting the acquired identification data #1 and position to the host processor 43.

It is to be noted that, though not depicted, at S64, a case in which a response signal is received at two locations on the panel face possibly occurs. This is, for example, a case in which two active pens 2 approach the panel face simultaneously. In such a case as just described, it is sufficient if the sensor controller 41 registers identification data included in the individual response signals into its own memory at S65 and sets its own operation mode to the two-pen mode at S66.

The sensor controller 41 further carries out a detection operation of a finger 3 in the time slots T5 to T7 and T9 to T11 (S70). Particular contents of this operation are such as described hereinabove, and therefore, description of them is omitted.

Figure 12:
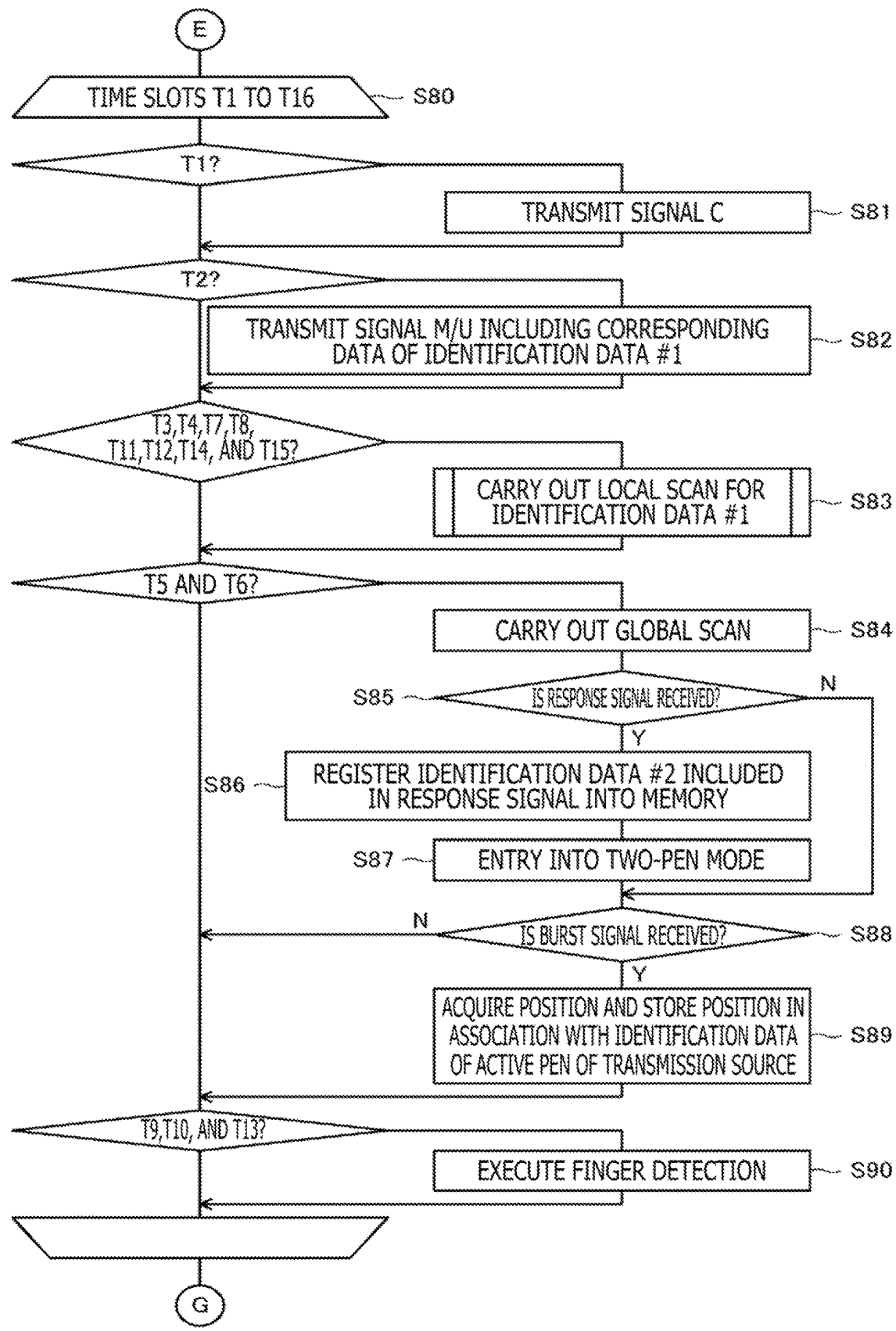
FIG. 12 is still another flow chart depicting the process performed by the sensor controller according to the embodiment of the present disclosure.

FIG. 12 depicts processes for one frame in the case where it is decided at S51 that the current operation mode is the full mode. The processes performed in the time slots by the sensor controller 41 in this case are such as described below (S80).

In particular, the sensor controller 41 first performs transmission of a command signal C in the time slot T1 (S81: first uplink signal transmission). Then in the time slot T2, the sensor controller 41 performs transmission of a multi uplink signal M/U including corresponding data of the identification data #1 (S82: second uplink signal transmission).

The sensor controller 41 further carries out local scan in regard to the identification data #1 in the time slots T3, T4, T7, T8, T11, T12, T14, and T15 (S83).

Figure 13:
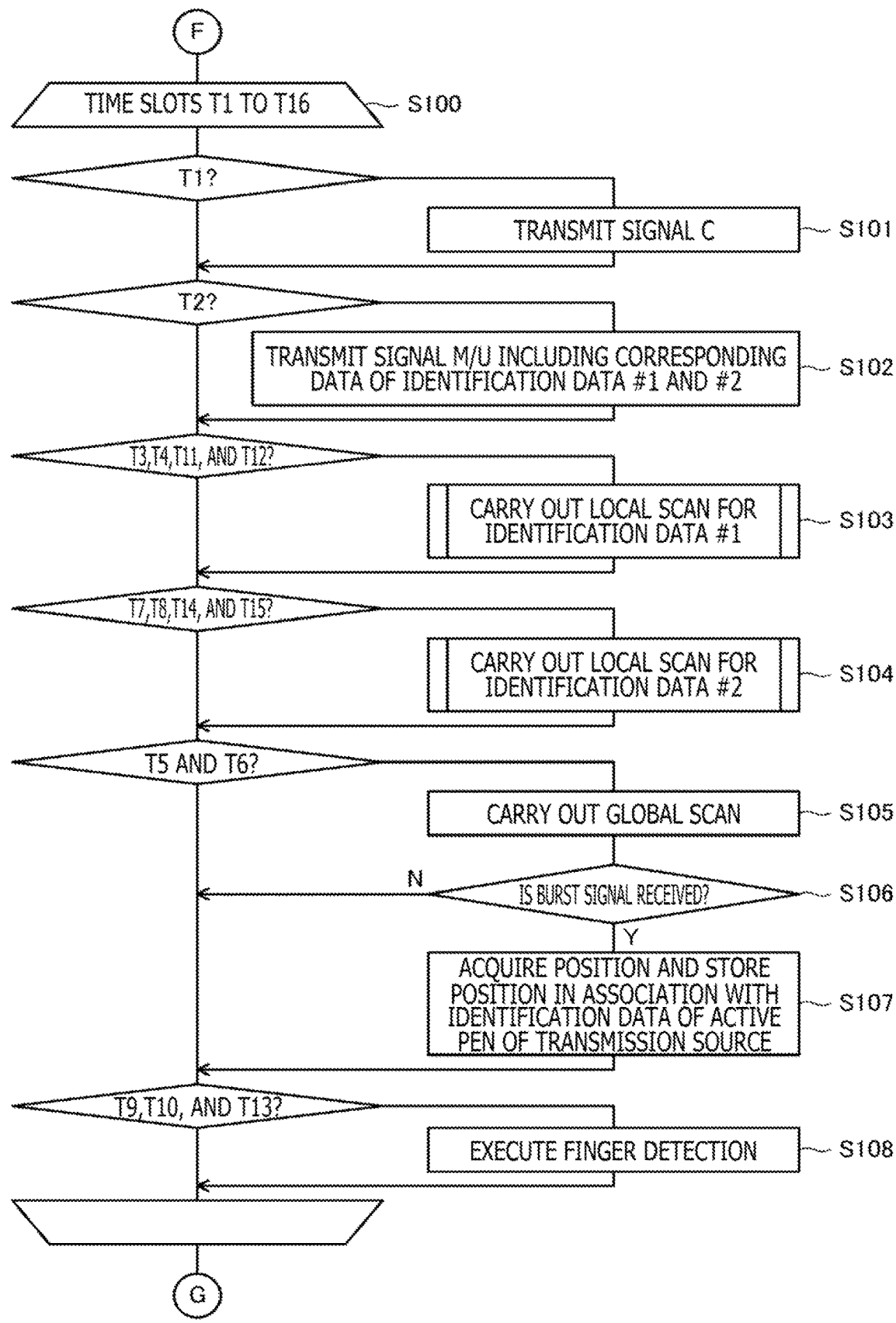
FIG. 13 is yet another flow chart depicting the process performed by the sensor controller according to the embodiment of the present disclosure.
Figure 14:
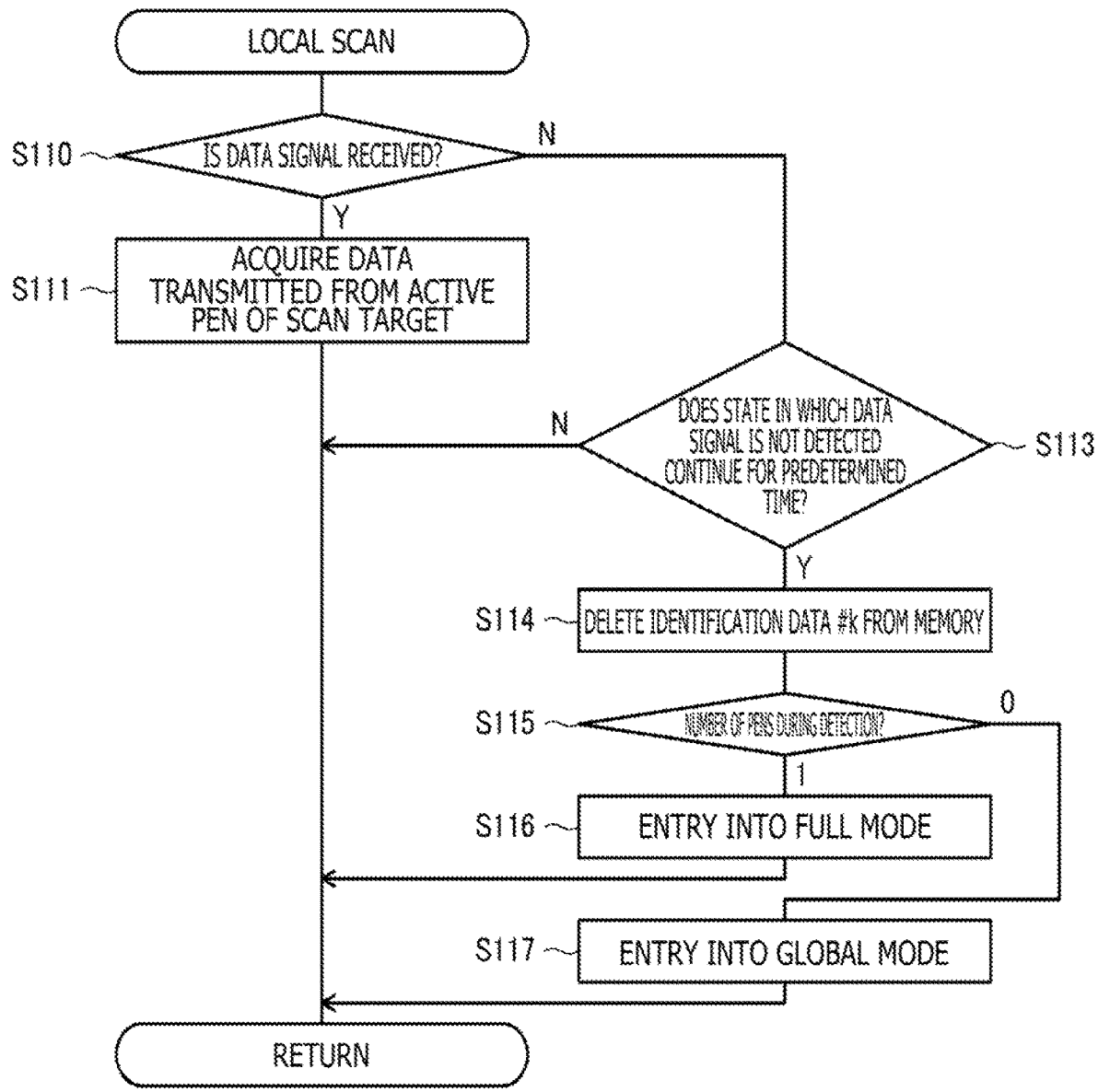
FIG. 14 is a flow chart depicting details of local scan carried out at S83 of FIG. 12 and at S103 and S104 of FIG. 13.

FIG. 14 is a flow chart depicting details of the local scan carried out at S83 and S103 and S104 (refer to FIG. 13) hereinafter described. As depicted in FIG. 14, the sensor controller 41 first performs a reception operation of a data signal (S110). This reception operation is performed using, from among the pluralities of the sensor electrodes 40X and 40Y, only a predetermined number of sensor electrodes in the proximity of the position of an active pen 2 of a scanning target (position stored in an associated relationship with identification data of the active pen 2 of the scanning target (such identification data is represented as identification data #k in FIG. 14)).

The sensor controller 41 when it is decided at S110 that a data signal is received acquires data transmitted from the active pen 2 of the scanning target (S111). Though not depicted, the data acquired in this manner is supplied in an associated relationship with the identification data #k from the sensor controller 41 to the host processor 43.

On the other hand, the sensor controller 41, when it is decided at S110 that a state in which a data signal is not received, decides whether or not a state in which a data signal from the active pen 2 of the scanning target is not detected has continued for a predetermined period of time (S113). In the case where it is decided that the state has continued, the sensor controller 41 deletes the identification data #k from its own memory (S114). Then, the sensor controller 41 decides which one of 0 and 1 the number of active pens 2 under detection (number of the remaining active pens 2) is (S115), and if the number is 1, then the sensor controller 41 sets its own operation mode to the full mode (S116), but if the number is 0, then the sensor controller 41 sets its own operation mode to the global mode (S117). Consequently, pairing with the active pen 2 having moved away from the panel face is cancelled.

After the process at S111, S116, or S117 ends or in the case where it is decided at S113 that the state has not continued, the sensor controller 41 ends the process for the local scan.

Referring back to FIG. 12, the sensor controller 41 carries out a global scan in the time slots T5 and T6 (S84: response signal detection). Then, the sensor controller 41 decides whether or not a response signal is received (S85), and only in the case where it is decided that a response signal is received, the sensor controller 41 extracts identification data included in the response signal (such identification data is hereinafter referred to as identification data #2) and registers the identification data into its own memory (S86: identification data extraction) and sets its own operation mode to the two-pen mode (S87). Further, the sensor controller 41 decides whether or not a burst signal is received (S88), and only in the case where it is decided that a burst signal is received, the sensor controller 41 acquires the position of the active pen 2 on the panel face based on the reception strengths of the burst signal at the pluralities of sensor electrodes 40X and 40Y and stores the position in an associated relationship with the identification data #2 (S69). Though not depicted, the sensor controller 41 performs also a process for outputting the acquired identification data #2 and position to the host processor 43.

It is to be noted that, at S88, there is the possibility that also a burst signal transmitted from the active pen 2 of the identification data #1 may be received. In this case, the sensor controller 41 stores the position of the active pen 2 acquired based on the burst signal in an associated relationship with the identification data #1 and outputs the position to the host processor 43.

The sensor controller 41 further carries out a detection operation of a finger 3 in the time slots T9, T10, and T13 (S90).

FIG. 13 depicts processes for one frame in the case where it is decided at S51 that the current mode is the two-pen mode. The processes performed in the time slots by the sensor controller 41 in this case are such as described below (S100).

In particular, the sensor controller 41 first performs transmission of a command signal C in the time slot T1 (S101: first uplink signal transmission). Then in the time slot T2, the sensor controller 41 performs transmission of a multi uplink signal M/U including corresponding data of the identification data #1 and #2 (S102: second uplink signal transmission).

The sensor controller 41 further carries out local scan for the identification data #1 in the time slots T3, T4, T11, and T12 (S103) and carries out local scan for the identification data #2 in the time slots T7, T8, T14, and T15 (S104). Detailed processing contents of the local scan are such as described hereinabove with reference to FIG. 14.

Further, the sensor controller 41 carries out global scan in the time slots T5 and T6 (S105). Then, the sensor controller 41 decides whether or not a burst signal is received (S106), and only in the case where it is decided that a burst signal is received, the sensor controller 41 acquires the position of the active pen 2 based on the burst signal and stores the position in an associated relationship with the identification data of the active pen 2 of the transmission source (S107). Though not depicted, the sensor controller 41 performs also a process for outputting the acquired position together with the corresponding identification data to the host processor 43.

Here, the sensor controller 41 in the two-pen mode does not perform a detection operation of a response signal. This is because the sensor controller 41 has already detected the maximum number (=2) of active pens 2. In this case, even if a new active pen 2 approaches the panel face and transmits a response signal, this is ignored by the sensor controller 41.

The sensor controller 41 further carries out a detection operation of a finger 3 in the time slots T9, T10, and T13 (S108).

Operation of the active pen 2 and the sensor controller 41 in the present embodiment has been described in more detail with reference to the processing flows.

Although the preferred embodiment of the present disclosure has been described, the present disclosure is not at all restricted by the embodiment and it is a matter of course that the present disclosure can be carried out in various manners without departing from the subject matter thereof.

For example, while, in the embodiment described above, the number of active pens 2 that can be used simultaneously in the electronic apparatus 4 is 2 in the maximum, also it is possible to configure the electronic apparatus 4 and the active pens 2 such that three or more active pens 2 can be used simultaneously.

Figure 15A:
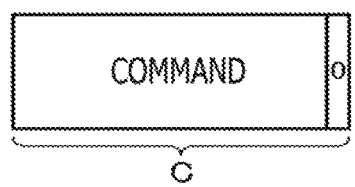
FIGS. 15A, 15B, and 15C are views depicting a command signal and a multi uplink signal according to a modification to the embodiment of the present disclosure.
Figure 15B:
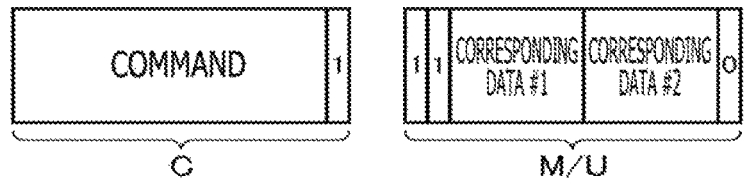
Figure 15C:
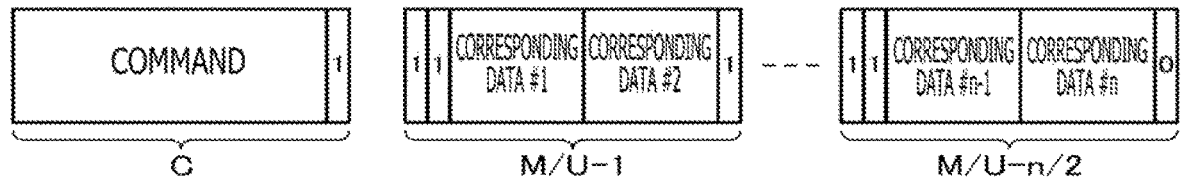

FIGS. 15A, 15B, and 15C are views depicting a command signal C and a multi uplink signal M/U in the case where n active pens 2 can be used simultaneously in the electronic apparatus 4. FIG. 15A depicts a case in which the mode of the sensor controller 41 is the global mode (in the case where zero active pen 2 is detected), FIG. 15B depicts another case in which the sensor controller 41 detects two active pens 2, and FIG. 15C depicts a case in which the sensor controller 41 detects n active pens 2. By increasing the number of multi uplink signals M/U to be transmitted as the detection number increases as in this case, it becomes possible to use three or more active pens 2 simultaneously in the electronic apparatus 4.

It is to be noted that, while, in the examples of FIG. 15, a plurality of multi uplink signals M/U are configured by lining up sets, each of which includes two corresponding data after two detected flags in order, a plurality of multi uplink signals M/U may be configured by deploying n corresponding data after n detected flags, or a plurality of multi uplink signals M/U may be configured by lining up sets, each of which includes one corresponding data after one detected flag in order, or else a plurality of multi uplink signals M/U may be configured by lining up sets, each of which includes m (m is one of 3 to n−1) corresponding data after m detected flags. Further, corresponding data may be deployed before a detected flag.

Further, in the case where the number of active pens 2 under detection is only one, the sensor controller 41 may not perform transmission of a multi uplink signal M/U. In this case, it is sufficient if, in the case where a multi uplink signal M/U is not received from the sensor controller 41, the active pen 2 having transmitted the response signal to the sensor controller 41 decides that only the active pen 2 itself is under detection by the sensor controller 41.

Further, the uplink signal US including a multi uplink signal M/U may not necessarily be transmitted from sensor electrodes arranged in a matrix. For example, wireless communication of Bluetooth (registered trademark) may be used to transmit a transmission timing of a downlink signal DS to be transmitted from an electrode 21 and corresponding data to an active pen 2.

Further, while the foregoing description of the embodiment is given taking a case in which an electronic pen ready for an active capacitive method is used as an example, the present disclosure can be applied widely to such a communication method that can detect a signal of an electronic pen in the case where the distance from the panel face to the electronic pen is short (for example, within 10 cm), for example, an electromagnetic induction method, an electromagnetic resonance method (EMR (registered trademark)), and so forth.

What is claimed is:

1. An active pen that is used together with a sensor controller, comprising:
   an electrode provided at a pen tip;
   a memory that stores identification data;
   a processor connected to the electrode and the memory,
      wherein the processor, in operation:

returns, as a response to a first uplink signal transmitted from the sensor controller, a first response signal including the identification data stored by the memory, wherein the identification data is stored by the memory before the first uplink signal is transmitted from the sensor controller, decides, based on whether data generated from the identification data sent from the active pen is included in one of a plurality of second uplink signals received after the first response signal is transmitted, whether the active pen is detected by the sensor controller, decides, based on the one of the plurality of second uplink signals, a number of active pens detected by the sensor controller, in response to deciding that the active pen is detected by the sensor controller, wherein each of the plurality of second uplink signals includes a plurality of detected flags, and the processor decides the number of active pens based on a number of the detected flags having a first value in the plurality of second uplink signals, wherein the plurality of second uplink signals further includes a plurality of items of corresponding data respectively corresponding to the plurality of detected flags, returns a second response signal according to the number of active pens detected by the sensor controller that is decided by the active pen, and decides that the active pen is detected by the sensor controller if one of the plurality of detected flags has the first value and one of the plurality of items of corresponding data, corresponding to the one of the plurality of detected flags, includes the data generated from the identification data sent from the active pen.

2. The active pen according to claim 1, wherein:
the processor determines a transmission rate of a downlink signal based on the number of active pens detected by the sensor controller.

3. The active pen according to claim 2, wherein:
in a case where the second uplink signals indicate an increase of the number of active pens detected by the sensor controller, the processor decreases the transmission rate of the downlink signal.

4. The active pen according to claim 1, wherein:
the identification data is a numerical value determined at random.

5. The active pen according to claim 1, wherein:
the identification data is a value a bit number equal to or smaller than a given bit number determined based on a stylus unique identifier of a given length.

6. The active pen according to claim 1, wherein:
the identification data is setting information stored in the memory.

7. The active pen according to claim 1, wherein:
in a case where the identification data stored in the memory is included in the one of the plurality of second uplink signals, the processor changes contents of the identification data stored in the memory.

8. The active pen according to claim 1, further comprising:
an indicator connected to the memory and the processor, wherein the indicator, in operation, displays color information.

9. The active pen according to claim 8, wherein the indicator includes a display that displays at least one character indicative of a color.

10. The active pen according to claim 8, wherein the indicator includes a display that displays a color corresponding to the color information.

11. The active pen according to claim 8, wherein, when the active pen determines that the active pen is not detected by the sensor controller, the indicator displays information indicating that the active pen is not detected by the sensor controller.

12. The active pen according to claim 1, wherein, when the number of active pens detected by the sensor controller that is decided by the active pen is two:
the second response signal is returned in one or more first time slots if the data generated from the identification data sent from the active pen is included in first data included in the one of the plurality of second uplink signals, and
the second response signal is returned in one or more second time slots different from the one or more first time slots if the data generated from the identification data sent from the active pen is included in second data included in the one of the plurality of second uplink signals, the second data being different from the first data.

13. The active pen according to claim 12, wherein, when the number of active pens detected by the sensor controller that is decided by the active pen is one, the second response signal is returned in the one or more first time slots and the one or more second time slots.

14. The active pen according to claim 1, wherein:
one or more of the plurality of detected flags includes data having the value "0",
each of the plurality of items of corresponding data includes data of a plurality of bits,
each of the plurality of bits of data included in one or more of the plurality of items of corresponding data, corresponding to the one or more of the plurality of detected flags including data having the value "0", has the value "0".

15. The active pen according to claim 1, wherein:
each of the plurality of detected flags includes data of one bit having a value "0" or a value "1", and
the first value is the value "1".

16. The active pen according to claim 1, wherein:
the plurality of second uplink signals includes at least an initial second uplink signal and a last second uplink signal that is transmitted after the initial second uplink signal,
each the plurality of second uplink signals includes an extension flag indicating whether one of the plurality of second uplink signals follows,
the extension flag of the initial second uplink signal has the first value, and
the extension flag of the last second uplink signal has a second value different from the first value.

* * * * *